United States Patent
Coster et al.

(10) Patent No.: US 7,659,002 B2
(45) Date of Patent: Feb. 9, 2010

(54) LOW EMISSIVITY COATING WITH LOW SOLAR HEAT GAIN COEFFICIENT, ENHANCED CHEMICAL AND MECHANICAL PROPERTIES AND METHOD OF MAKING THE SAME

(75) Inventors: Dominique Coster, Meux-La Bruyere (BE); Peter Maschwitz, Sebastopol, CA (US); Daniel Decroupet, Fosses-La-Ville (BE); Keith Grubb, Faribault, MN (US)

(73) Assignee: AGC Flat Glass North America, Inc., Alpharetta, GA (US)

( * ) Notice: Subject to any disclaimer, the term of this patent is extended or adjusted under 35 U.S.C. 154(b) by 89 days.

(21) Appl. No.: 11/648,913

(22) Filed: Jan. 3, 2007

(65) Prior Publication Data

US 2007/0281171 A1  Dec. 6, 2007

Related U.S. Application Data

(63) Continuation of application No. 11/431,915, filed on May 11, 2006, now abandoned.

(60) Provisional application No. 60/680,008, filed on May 12, 2005, provisional application No. 60/736,876, filed on Nov. 16, 2005, provisional application No. 60/750,782, filed on Dec. 16, 2005.

(51) Int. Cl.
*B32B 17/06* (2006.01)
(52) U.S. Cl. ............... 428/432; 428/426; 428/428; 428/434; 428/446; 428/448; 428/697; 428/698; 428/701; 428/699; 428/702

(58) Field of Classification Search ............. None
See application file for complete search history.

(56) References Cited

U.S. PATENT DOCUMENTS

| 4,806,220 A | 2/1989 | Finley |
| 4,816,054 A | 3/1989 | Schmitte |
| 4,898,790 A | 2/1990 | Finley |

(Continued)

FOREIGN PATENT DOCUMENTS

WO  WO 2006/124503 A2  11/2006

(Continued)

OTHER PUBLICATIONS

Australian Written Opinion issued in SG 200717660-5 on Nov. 18, 2008, 6 pages.

(Continued)

*Primary Examiner*—Ling Xu
(74) *Attorney, Agent, or Firm*—Rothwell, Figg, Ernst & Manbeck, P.C.

(57) ABSTRACT

The invention provides low-emissivity stacks comprising at least one absorbing layer, said stacks being characterized by a low solar heat gain coefficient (SHGC), enhanced aesthetics, mechanical and chemical durability, and a tolerance for tempering or heat strengthening. The invention moreover provides low-emissivity coatings comprising, in order outward from the substrate a first dielectric layer, a first Ag layer; a first barrier layer; a first absorbing layer; a second dielectric layer; a second Ag layer; a second absorbing layer; a third dielectric layer; and optionally, a topcoat layer, and methods for depositing such coatings on substrates.

67 Claims, 11 Drawing Sheets

U.S. PATENT DOCUMENTS

| | | | |
|---|---|---|---|
| 4,995,895 A | 2/1991 | Groth et al. |
| 5,028,759 A | 7/1991 | Finley |
| 5,057,375 A | 10/1991 | Gordon |
| 5,059,295 A | 10/1991 | Finley |
| 5,066,615 A | 11/1991 | Brady et al. |
| 5,085,926 A | 2/1992 | Iida et al. |
| 5,106,786 A | 4/1992 | Brady et al. |
| 5,110,637 A | 5/1992 | Ando et al. |
| 5,112,693 A | 5/1992 | Gillery |
| 5,135,808 A | 8/1992 | Kimock et al. |
| 5,147,125 A | 9/1992 | Austin |
| 5,167,986 A | 12/1992 | Gordon |
| 5,201,926 A | 4/1993 | Szczyrbowski et al. |
| 5,209,835 A | 5/1993 | Makino et al. |
| 5,214,530 A * | 5/1993 | Coombs et al. ............. 359/359 |
| 5,229,881 A | 7/1993 | Day et al. |
| 5,264,286 A | 11/1993 | Ando et al. |
| 5,268,217 A | 12/1993 | Kimock et al. |
| 5,270,517 A | 12/1993 | Finley |
| 5,302,449 A | 4/1994 | Eby et al. |
| 5,338,422 A | 8/1994 | Belkind et al. |
| 5,354,446 A | 10/1994 | Kida et al. |
| 5,362,552 A | 11/1994 | Austin |
| 5,376,455 A | 12/1994 | Hartig et al. |
| 5,377,045 A | 12/1994 | Wolfe et al. |
| 5,399,435 A | 3/1995 | Ando et al. |
| 5,409,517 A | 4/1995 | Satou et al. |
| 5,417,827 A | 5/1995 | Finley |
| 5,418,071 A | 5/1995 | Satou et al. |
| 5,464,674 A | 11/1995 | Makino et al. |
| 5,506,038 A | 4/1996 | Knapp et al. |
| 5,508,000 A | 4/1996 | Satou et al. |
| 5,508,092 A | 4/1996 | Kimock et al. |
| 5,510,173 A | 4/1996 | Pass et al. |
| 5,514,485 A | 5/1996 | Ando et al. |
| 5,527,596 A | 6/1996 | Kimock et al. |
| 5,552,180 A | 9/1996 | Finley et al. |
| 5,584,902 A | 12/1996 | Hartig et al. |
| 5,605,609 A | 2/1997 | Ando et al. |
| 5,612,571 A | 3/1997 | Satou et al. |
| 5,635,245 A | 6/1997 | Kimock et al. |
| 5,637,353 A | 6/1997 | Kimock et al. |
| 5,643,423 A | 7/1997 | Kimock et al. |
| 5,674,304 A | 10/1997 | Fukada et al. |
| 5,705,278 A | 1/1998 | Gillery et al. |
| 5,709,938 A | 1/1998 | Finley |
| 5,750,265 A | 5/1998 | Goodman |
| 5,763,063 A | 6/1998 | Pass et al. |
| 5,772,862 A | 6/1998 | Ando et al. |
| 5,800,684 A | 9/1998 | Gagliardi et al. |
| 5,834,103 A | 11/1998 | Bond et al. |
| 5,844,225 A | 12/1998 | Kimock et al. |
| 5,851,678 A | 12/1998 | Hasz et al. |
| 5,897,957 A | 4/1999 | Goodman |
| 5,902,634 A | 5/1999 | Maschwitz et al. |
| 5,914,189 A | 6/1999 | Hasz et al. |
| 5,929,487 A | 7/1999 | Fukada et al. |
| 5,935,702 A | 8/1999 | Macquart et al. |
| 6,007,901 A | 12/1999 | Maschwitz et al. |
| 6,030,671 A | 2/2000 | Yang et al. |
| 6,040,378 A | 3/2000 | Sanduja et al. |
| 6,045,896 A | 4/2000 | Boire et al. |
| 6,060,178 A | 5/2000 | Krisko |
| 6,106,903 A | 8/2000 | Upadhya |
| 6,123,986 A | 9/2000 | Maschwitz et al. |
| 6,132,881 A | 10/2000 | Hartig et al. |
| 6,139,969 A | 10/2000 | Finley |
| 6,159,621 A | 12/2000 | Schicht et al. |
| 6,190,776 B1 | 2/2001 | Demiryont |
| 6,210,813 B1 | 4/2001 | Burke et al. |
| 6,231,971 B1 | 5/2001 | Terneu et al. |
| 6,231,999 B1 | 5/2001 | Krisko |
| 6,238,807 B1 | 5/2001 | Yasuda et al. |
| 6,261,643 B1 | 7/2001 | Hasz et al. |
| 6,265,076 B1 | 7/2001 | McCurdy et al. |
| 6,268,631 B1 | 7/2001 | Fukada et al. |
| 6,274,244 B1 | 8/2001 | Finley et al. |
| 6,316,111 B1 | 11/2001 | Krisko |
| 6,322,881 B1 | 11/2001 | Boire et al. |
| 6,335,124 B1 | 1/2002 | Mitsui et al. |
| 6,340,529 B1 | 1/2002 | Ebisawa et al. |
| 6,346,174 B1 | 2/2002 | Finley et al. |
| 6,352,780 B1 | 3/2002 | Sanduja et al. |
| 6,355,334 B1 | 3/2002 | Rondeau et al. |
| 6,361,581 B2 | 3/2002 | Yasuda et al. |
| 6,365,014 B2 | 4/2002 | Finley |
| 6,399,228 B1 | 6/2002 | Simpson |
| 6,410,173 B1 | 6/2002 | Arfsten et al. |
| 6,412,307 B2 | 7/2002 | Demiryont |
| 6,413,386 B1 | 7/2002 | Callegari et al. |
| 6,413,643 B1 | 7/2002 | Kunisada et al. |
| 6,416,872 B1 | 7/2002 | Maschwitz |
| 6,423,414 B1 | 7/2002 | Legrand et al. |
| 6,428,885 B1 | 8/2002 | Seitz et al. |
| 6,436,480 B1 | 8/2002 | Upadhya |
| 6,445,503 B1 | 9/2002 | Lingle |
| 6,451,434 B1 | 9/2002 | Ebisawa et al. |
| 6,472,072 B1 | 10/2002 | Ebisawa et al. |
| 6,475,626 B1 | 11/2002 | Stachowiak |
| 6,495,251 B1 * | 12/2002 | Arbab et al. ................ 428/336 |
| 6,495,263 B2 | 12/2002 | Stachowiak |
| 6,514,620 B1 | 2/2003 | Lingle et al. |
| 6,524,668 B1 | 2/2003 | Tsuji et al. |
| 6,537,910 B1 | 3/2003 | Burke et al. |
| 6,558,800 B1 | 5/2003 | Stachowiak |
| 6,562,490 B2 | 5/2003 | Ebisawa et al. |
| 6,576,349 B2 | 6/2003 | Lingle et al. |
| 6,581,669 B2 | 6/2003 | Weigert et al. |
| 6,582,809 B2 | 6/2003 | Boire et al. |
| 6,586,102 B1 | 7/2003 | Stachowiak |
| 6,589,658 B1 | 7/2003 | Stachowiak |
| 6,592,996 B1 | 7/2003 | Kunisada et al. |
| 6,596,368 B1 | 7/2003 | Liebig et al. |
| 6,602,587 B2 | 8/2003 | Macquart et al. |
| 6,602,608 B2 | 8/2003 | Stachowiak |
| 6,605,358 B1 | 8/2003 | Stachowiak |
| 6,610,410 B2 | 8/2003 | Ebisawa et al. |
| 6,623,794 B2 | 9/2003 | Finley et al. |
| 6,627,317 B2 | 9/2003 | Wang |
| 6,630,284 B1 | 10/2003 | Maschwitz |
| 6,632,491 B1 | 10/2003 | Thomsen et al. |
| 6,650,478 B1 | 11/2003 | DeBusk et al. |
| 6,656,522 B2 | 12/2003 | Arfsten et al. |
| 6,667,121 B2 | 12/2003 | Wang |
| 6,673,438 B1 | 1/2004 | Bond et al. |
| 6,682,773 B2 | 1/2004 | Medwick et al. |
| 6,686,050 B2 | 2/2004 | Lingle et al. |
| 6,689,475 B1 | 2/2004 | Lin |
| 6,692,831 B2 | 2/2004 | Stachowiak |
| 6,699,585 B2 | 3/2004 | Ebisawa et al. |
| 6,723,211 B2 | 4/2004 | Lingle et al. |
| 6,730,352 B2 | 5/2004 | Stachowiak |
| 6,730,389 B2 | 5/2004 | Voeltzel |
| 6,749,941 B2 | 6/2004 | Lingle |
| 6,770,321 B2 | 8/2004 | Hukari et al. |
| 6,782,718 B2 | 8/2004 | Lingle et al. |
| 6,783,861 B2 | 8/2004 | Ebisawa et al. |
| 6,793,781 B2 | 9/2004 | Finley |
| 6,800,179 B2 | 10/2004 | Wang |
| 6,802,943 B2 | 10/2004 | Stachowiak |
| 6,804,048 B2 | 10/2004 | MacQuart et al. |
| 6,811,901 B1 | 11/2004 | Arfsten et al. |
| 6,830,817 B2 | 12/2004 | Stachowiak |
| 6,833,194 B1 | 12/2004 | O'Shaughnessy |

| | | |
|---|---|---|
| 6,838,159 B2 | 1/2005 | Eby et al. |
| 6,847,097 B2 | 1/2005 | Fukada et al. |
| 6,849,328 B1 | 2/2005 | Medwick et al. |
| 6,852,419 B2 | 2/2005 | Stachowiak |
| 6,863,928 B2 | 3/2005 | Stachowiak |
| 6,869,644 B2 | 3/2005 | Buhay et al. |
| 6,881,487 B2 | 4/2005 | Lin |
| 6,881,505 B2 | 4/2005 | Tixhon |
| 6,887,575 B2 | 5/2005 | Neuman et al. |
| 6,890,659 B2 | 5/2005 | Stachowiak |
| 6,899,953 B1 | 5/2005 | O'Shaughnessy et al. |
| 6,908,679 B2 | 6/2005 | Stachowiak et al. |
| 6,916,408 B2 | 7/2005 | Laird et al. |
| 6,916,542 B2 | 7/2005 | Buhay et al. |
| 6,919,133 B2 | 7/2005 | Hartig et al. |
| 6,929,864 B2 | 8/2005 | Fleming et al. |
| 6,936,347 B2 | 8/2005 | Laird et al. |
| 6,942,917 B2 | 9/2005 | Bond et al. |
| 6,942,923 B2 | 9/2005 | Stachowiak |
| 6,962,759 B2 | 11/2005 | Buhay et al. |
| 6,967,060 B2 | 11/2005 | Stachowiak |
| 6,994,910 B2 | 2/2006 | Stachowiak |
| 7,005,190 B2 | 2/2006 | Laird |
| 7,025,859 B2 | 4/2006 | Stachowiak |
| 7,037,555 B2 | 5/2006 | Terneu et al. |
| 7,037,577 B2 | 5/2006 | Macquart et al. |
| 7,037,589 B2 | 5/2006 | Hartig et al. |
| 7,038,302 B2 | 5/2006 | Fukada et al. |
| 7,056,587 B2 | 6/2006 | Suzuki |
| 7,056,588 B2 | 6/2006 | Neuman et al. |
| 7,057,805 B2 | 6/2006 | Phillips et al. |
| 7,063,893 B2 | 6/2006 | Hoffman |
| 7,067,195 B2 | 6/2006 | Hoffman et al. |
| 7,081,301 B2 | 7/2006 | Stachowiak |
| 7,081,302 B2 | 7/2006 | Lemmer et al. |
| 7,087,309 B2 | 8/2006 | Kriltz |
| 7,090,921 B2 | 8/2006 | Stachowiak |
| 7,101,810 B2 | 9/2006 | Bond et al. |
| 7,122,252 B2 | 10/2006 | Hoffman |
| 7,138,182 B2 | 11/2006 | Krisko et al. |
| 7,147,924 B2 | 12/2006 | Stachowiak |
| 7,150,916 B2 | 12/2006 | Lemmer et al. |
| 7,153,577 B2 | 12/2006 | Wang et al. |
| 7,153,578 B2 | 12/2006 | Chonlamaitri et al. |
| 7,153,579 B2 | 12/2006 | Kriltz et al. |
| 7,189,458 B2 | 3/2007 | Ferreira et al. |
| 7,192,648 B2 | 3/2007 | Hartig et al. |
| 7,195,821 B2 | 3/2007 | Tixhon |
| 7,198,851 B2 | 4/2007 | Lemmer et al. |
| 2001/0006734 A1 | 7/2001 | Demiryont |
| 2002/0127380 A1 | 9/2002 | Suzuki |
| 2002/0127439 A1 | 9/2002 | Finley et al. |
| 2002/0136905 A1 | 9/2002 | Medwick et al. |
| 2002/0172775 A1 | 11/2002 | Buhay et al. |
| 2002/0192474 A1 | 12/2002 | Lingle |
| 2003/0049464 A1 | 3/2003 | Glenn et al. |
| 2003/0152755 A1 | 8/2003 | Suzuki |
| 2003/0183508 A1 | 10/2003 | Weigert et al. |
| 2003/0194488 A1* | 10/2003 | Stachowiak ............ 427/162 |
| 2003/0194567 A1 | 10/2003 | Lingle et al. |
| 2003/0198816 A1 | 10/2003 | Lingle et al. |
| 2003/0228476 A1 | 12/2003 | Buhay et al. |
| 2003/0228484 A1 | 12/2003 | Finley et al. |
| 2003/0235719 A1 | 12/2003 | Grimal et al. |
| 2004/0086723 A1 | 5/2004 | Thomsen et al. |
| 2004/0101694 A1 | 5/2004 | Lingle et al. |
| 2004/0147185 A1 | 7/2004 | Decroupet |
| 2004/0197574 A1 | 10/2004 | Stachowiak |
| 2004/0224167 A1 | 11/2004 | Stachowiak |
| 2004/0229073 A1 | 11/2004 | Dietrich et al. |
| 2004/0229074 A1 | 11/2004 | Lingle et al. |
| 2004/0247929 A1 | 12/2004 | Buhay et al. |
| 2005/0019484 A1 | 1/2005 | Arfsten et al. |
| 2005/0123772 A1* | 6/2005 | Coustet et al. ............ 428/432 |
| 2005/0129863 A1 | 6/2005 | O'Shaughnessy |
| 2005/0145480 A1 | 7/2005 | Neuman et al. |
| 2005/0153126 A1 | 7/2005 | Finley et al. |
| 2005/0164015 A1 | 7/2005 | Laird et al. |
| 2005/0186482 A1 | 8/2005 | Maschwitz |
| 2005/0191501 A1 | 9/2005 | Lemmer et al. |
| 2005/0191502 A1 | 9/2005 | Lemmer et al. |
| 2005/0196622 A1 | 9/2005 | Laird et al. |
| 2005/0196632 A1 | 9/2005 | Maschwitz et al. |
| 2005/0202254 A1 | 9/2005 | Nunez-Regueiro et al. |
| 2005/0202255 A1 | 9/2005 | Lemmer et al. |
| 2005/0205416 A1 | 9/2005 | Stachowiak |
| 2005/0238861 A1 | 10/2005 | Buhay et al. |
| 2005/0258029 A1 | 11/2005 | Muller et al. |
| 2005/0260419 A1 | 11/2005 | Hukari et al. |
| 2005/0287309 A1 | 12/2005 | Veerasamy |
| 2006/0008654 A1 | 1/2006 | Veerasamy |
| 2006/0008655 A1 | 1/2006 | Butz et al. |
| 2006/0008656 A1 | 1/2006 | Veerasamy |
| 2006/0008657 A1 | 1/2006 | Kriltz et al. |
| 2006/0029813 A1 | 2/2006 | Kutilek et al. |
| 2006/0046072 A1 | 3/2006 | Ferreira et al. |
| 2006/0046073 A1 | 3/2006 | Neuman et al. |
| 2006/0081457 A1 | 4/2006 | Butz et al. |
| 2006/0083934 A1 | 4/2006 | Butz et al. |
| 2006/0099428 A1 | 5/2006 | Butz et al. |

FOREIGN PATENT DOCUMENTS

| | | | |
|---|---|---|---|
| WO | WO 2008/060453 A2 | | 5/2008 |
| WO | WO-02/48065 | * | 6/2008 |

OTHER PUBLICATIONS

PCT International Search Report issued in PCT/US 06/18214 on Sep. 27, 2007, 10 pages.

* cited by examiner

LOW EMISSIVITY COATING WITH LOW SOLAR HEAT GAIN COEFFICIENT, ENHANCED CHEMICAL AND MECHANICAL PROPERTIES AND METHOD OF MAKING THE SAME

This application is a continuation of U.S. application Ser. No. 11/431,915, filed May 11, 2006, which claims benefit of U.S. Provisional Application No. 60/680,008, filed May 12, 2005, U.S. Provisional Application No. 60/736,876, filed Nov. 16, 2005, and U.S. Provisional Application No. 60/750,782, filed Dec. 16, 2005, all of which are hereby incorporated by reference in their entireties into the present application.

FIELD OF THE INVENTION

The present invention relates generally to low emissivity ("low-e") coatings, and more particularly to coatings with low solar heat gain coefficient (SHGC) ("low-g") and retained or enhanced mechanical and chemical durability.

BACKGROUND OF THE INVENTION

All United States patents referred to herein are hereby incorporated by reference in their entireties. In the case of conflict, the present specification, including definitions, will control.

Solar control coatings on transparent panels or substrates are designed to permit the passage of visible light while blocking infrared (IR) radiation. High visible transmittance, low emissivity coatings on, e.g., architectural glass and automobile windows can lead to substantial savings in costs associated with environmental control, such as heating and cooling costs.

Generally speaking, coatings that provide for high visible transmittance and low emissivity are made up of a stack, which typically includes a transparent substrate and an optical coating. The stack includes one or more thin metallic layers, with high IR reflectance and low transmissivity, disposed between anti-reflective dielectric layers. These systems reflect radiant heat and provide insulation from the cold as well as from solar radiation. Most low-e stacks in use today are based on transparent dielectrics. In general, the thickness of the dielectric layers are tuned in to reduce inside and outside reflectance so that the light transmittance is high (>60%). The IR reflective metallic layers may be virtually any reflective metal, such as silver, copper, or gold. Silver (Ag) is most frequently used for this application due to its relatively neutral color. The anti-reflective dielectric layers are generally transparent material selected to enhance visible transmittance.

Conventional low emissivity coatings generally strive to maintain reflection relatively constant throughout the visible spectrum so that the coating has a "neutral" color; i.e., is essentially colorless. However, conventional low-emissivity coatings fail to provide the extremes of reflected color required for aesthetic and other reasons by certain applications.

To achieve the desired properties in a coated substrate, the composition and thickness of each of the layers of a multilayer coating must be chosen carefully. For example, the thickness of an IR reflective layer such as Ag must be chosen carefully. It is well known that the emissivity of a Ag layer tends to decrease with decreasing Ag sheet resistance. Thus, to obtain a low emissivity Ag layer, the sheet resistance of the Ag layer should be as low as possible. However, increasing Ag layer thickness will also cause visible transmission to decrease and can result in colors that are generally undesirable. It would be desirable to be able to increase visible transmission by decreasing Ag layer thickness without increasing sheet resistance and emissivity.

Thin, transparent metal layers of Ag are susceptible to corrosion when they are brought into contact, under moist or wet conditions, with various corrosive agents, such as atmosphere-carried chlorides, sulfides, sulfur dioxide and the like. To protect the Ag layers, various barrier layers can be deposited on the Ag. However, the protection provided by conventional barrier layers is frequently inadequate.

Coated glass is used in a number of applications where the coating is exposed to elevated temperatures. For example, coatings on glass windows in self-cleaning kitchen ovens are repeatedly raised to cooking temperatures of 120-230° C., with frequent excursions to, e.g., 480° C. during cleaning cycles. In addition, when coated glass is tempered or bent, the coating is heated along with the glass to temperatures on the order of 600° C. and above for periods of time up to several minutes. These thermal treatments can cause the optical properties of Ag coatings to deteriorate irreversibly. This deterioration can result from oxidation of the Ag by oxygen diffusing across layers above and below the Ag. The deterioration can also result from reaction of the Ag with alkaline ions, such as sodium (Na+), migrating from the glass. The diffusion of the oxygen or alkaline ions can be facilitated and amplified by the deterioration or structural modification of the dielectric layers above and below the Ag. Coatings must be able to withstand these elevated temperatures. However, previously known multilayer coatings employing Ag as an infrared reflective film frequently cannot withstand such temperatures without some deterioration of the Ag film.

Low emissivity coatings are described in U.S. Pat. Nos. 4,749,397 and 4,995,895. Vacuum deposited low emissivity coatings containing silver are presently sold in the fenestration marketplace.

U.S. Pat. No. 4,995,895 teaches the use of oxidizable metals as haze reduction topcoats useful for protecting temperable low-e coatings. This patent is directed to methods of reducing haze resulting from exposure to temperatures over 600° C.

Metal, metal alloy and metal oxide coatings have been applied to low emissivity silver coatings to improve the properties of the coated object. U.S. Pat. No. 4,995,895 describes a metal or metal alloy layer which is deposited as the outermost layer of the total layers applied to a glass base. The metal or metal alloy layer is oxidized and acts as an anti-reflection coating. U.S. Pat. No. 4,749,397 describes a method where a metal oxide layer is deposited as an antireflection layer. Sandwiching the silver layer between anti-reflection layers optimizes light transmission.

Unfortunately, optical coatings are frequently damaged during shipping and handling, including by scratching and by exposure to corrosive environments. Silver based low-emissivity coatings are particularly susceptible to corrosion problems. Most low emissivity stacks in use today make use of barrier layers somewhere in or on the low emissivity thin layer stack to reduce these problems. Thin barriers function to reduce the corrosion of silver layers from water vapor, oxygen or other fluids. Some reduce damage from physical scratching of the low emissivity stack by virtue of their hardness or by lowering friction if they form the outer layer.

For sub-desert areas as well as regions with an intense sun load, the current high transmittance low-e products are already bringing advantages, but the heat and light load is still too high to maximize the thermal and visual comfort inside the houses and buildings in which such low-e products are being used.

A few low-e stacks with lower light transmittance are available, but such products usually exhibit at least one of the following draw backs: high reflectance, which makes them less aesthetically appealing, or high shading coefficient, which makes them inappropriate for controlling the heat load.

Very few commercially available low-e products combine the desired optical properties and shading coefficient. Those that do still require additional modifications to make them ideal for processing and production. Further, such low-e coatings are soft coatings that require extra attention during storage and processing into an insulating glass unit. It is desirable to improve the current mechanical and chemical durability of such coatings.

Producing different stack designs on the same coater also can often present a problem because the set-up requirements are not always compatible between the different designs. It would be desirable to provide different coatings that can be produced simultaneously on a coater without requiring down time and modification of the coater layout.

Furthermore, for safety reasons, more glass is now being heat treated to increase its mechanical strength and avoid laceration in case of breakage. This is especially true for low SHGC products. The increase in energy absorption of the coating increases the potential thermal stress on the light when part of it is exposed to the sun radiation and part of it is in the shade. Typical low-e coatings are not designed to withstand thermal strengthening or tempering. Such conditions can completely damage the coating, destroying its aesthetic appeal, thereby rendering it unusable.

PPG has made a low SHGC product available on the market but it is characterized by a very significant high light reflectance (see LBL Window5 database). Moreover, it is Applicant's understanding that this product can be difficult to handle because of a tendency toward scratching. PPG patent application WO 03/020656/A1 describes the making of coatings characterized by a SHGC below 0.38 (i.e., 38%), but having a light reflection exceeding 20%, resulting in a mirror-like look, which is inappropriate for many applications.

Cardinal patent application CA 2 428 860 describes a coating with a low SHGC and appealing aesthetic characteristics. There is no reference to its chemical and mechanical durability, but notably the application does not refer to a double layer of the type NiCrOx/NiCr, which layer is beneficial for the durability of the coating. Furthermore, the use of Zn oxide as primary dielectric material makes it difficult or impossible to temper the coating.

Guardian WO 2003/042122 refers to the sputtering of double Ag temperable products with multiple barriers. However, only coatings with high light transmittance are described.

Guardian WO 02/062717 refers to low light transmittance coatings that are characterized by the ability to be tempered. However, only single Ag coatings with SHGC higher than 0.40 are exemplified.

St. Gobain patent application WO 03/010105 refers to stacks including the following sequence: dielectric/Absorbing layer (metallic, eventually nitrided)/Ag/dielectric. The presence of a metallic layer under the Ag tends to decrease the Ag nucleation. It also weakens the mechanical durability of the stack.

St. Gobain application WO 02/48065 describes the use of absorbing materials in a low-e stack in order to control light transmittance. The application focuses on cladding the absorbing layer between 2 dielectrics. This is intended to improve the thermal stability of the stack during heat treatment. Notwithstanding whether or not the location of the absorbing layer surrounded by dielectric material provides some advantages in insuring thermal stability, this configuration is inconvenient and results in inefficient production. The sputtering of the absorbing layer will be affected by "gas cross talk" inside the coater. This makes the nature of the absorbing layer less controllable and the long term stability questionable. For instance, if a layer of absorbing TiN is sputtered next to an oxide dielectric coat zone, the TiN will be contaminated by oxygen. The TiN layer would then be less absorbing. These problems might be addressed by improving the gas insulation of each coat zone, but this process is costly and undesirable for the production of other low-e coatings on the same coater.

CPFilms U.S. Pat. No. 6,007,901 refers to layer systems based on double metallic barriers.

There thus remains a need for low emissivity coating stacks (and methods of making them) that overcome the various problems seen in the prior art. In particular, there is a need for low-e stacks having a low solar heat gain coefficient, which stacks exhibit retained or increased aesthetic appeal, and mechanical and/or chemical durability, and which can be tempered or heat strengthened, if desired. Moreover, there is a need for stacks that can be applied without need for a specific, nonstandard coater.

SUMMARY OF INVENTION

To overcome the problems associated with previous low emissivity coatings, the present invention provides improved coatings that yield stacks that have a low solar heat gain coefficient (i.e., low-g stacks), are aesthetically appealing, and exhibit equal or better chemical and mechanical durability than typical low emissivity stacks. Moreover, the invention provides products which are compatible with standard production methods. In particular, for example, shifting from a standard coater to a low-g coater would not require venting or other change in coater layout. Furthermore, glass substrates coated in accordance with the invention surprisingly can be tempered or heat strengthened without such tempering or heat strengthening causing degradation in the stack layers or in the optical qualities of the coated substrate or causing the other drawbacks typically seen when such processes are used in connection with low emissivity coatings.

The present invention overcomes the disadvantages seen in the art through the introduction of at least one thin absorbing layer into a low emissivity stack. The introduction of absorbing material decreases the overall light transmittance without increasing the light reflectance. Such increased light reflectance is frequently a problem, particularly when it occurs on a pane facing the inside of a building.

The appropriate choice of absorbing material also enables one to control the transmittance color of the coated glass. The absorbing layer preferably is inserted between the barrier protecting the Ag layer and the dielectrics. Accordingly, in an aspect, the invention provides a low-emissivity coating on a substrate, the coating comprising, in order outward from the substrate, a first dielectric layer; a first Ag layer; a first barrier layer; a first absorbing layer; a second dielectric layer; a second Ag layer; a second barrier layer; a second absorbing layer; a third dielectric layer; and optionally, a topcoat layer, wherein either the first absorbing layer or the second absorbing layer is optional, that is, two absorbing layers are not required. The invention also provides coatings as described above, but which have a single Ag layer, rather than two or more Ag layers. The coatings of the present invention are formed by depositing the layers onto the substrate. A preferred method includes depositing by magnetron sputtering.

BRIEF DESCRIPTION OF THE DRAWINGS

FIG. 6A provides data relating to the index of refraction (n) and FIG. 6B provides data relating to extinction coefficient (k).

DETAILED DESCRIPTION OF THE INVENTION

Figure 1:
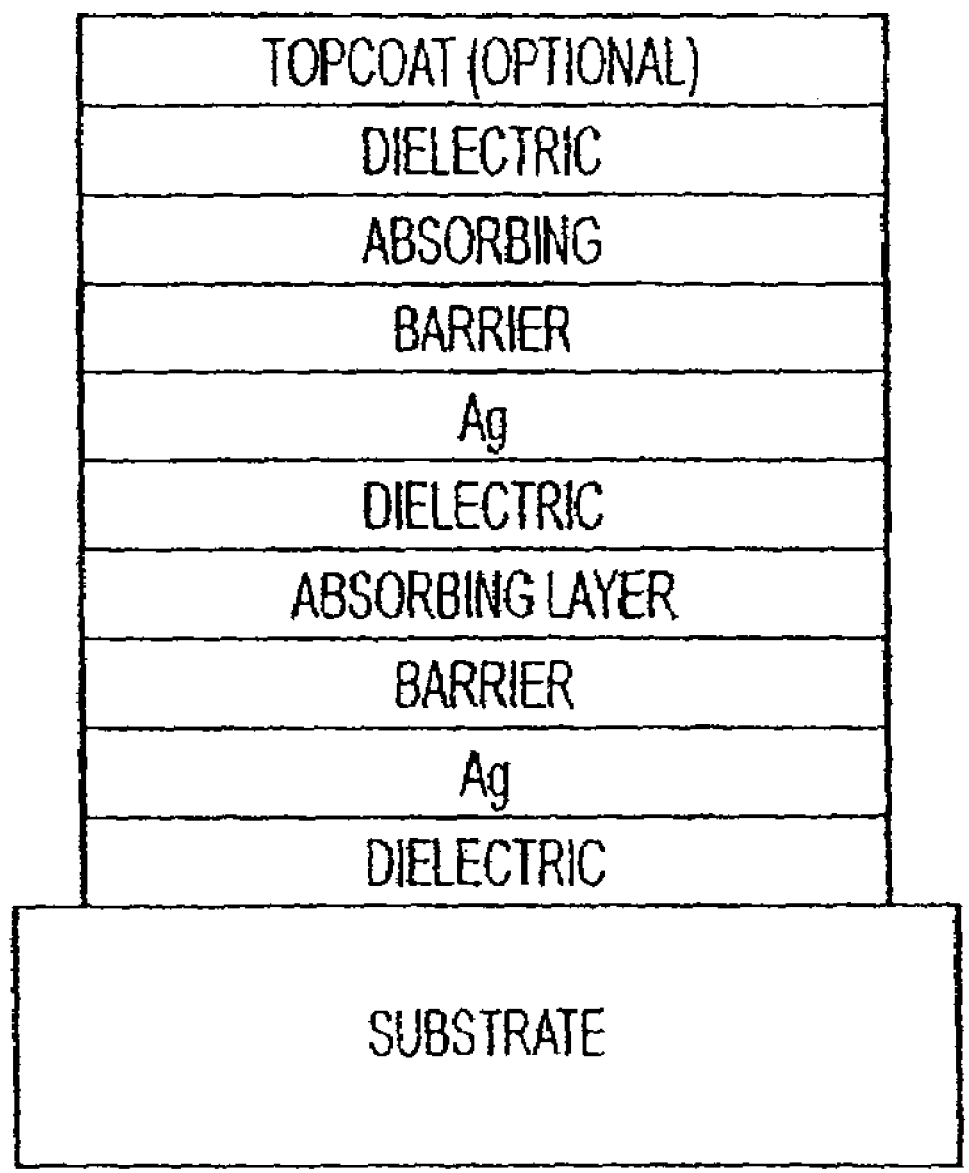
FIG. 1 depicts an embodiment of an aesthetically appealing low-emissivity stack, exhibiting low SHGC and enhanced mechanical and/or chemical durability in accordance with the present invention.
Figure 2:
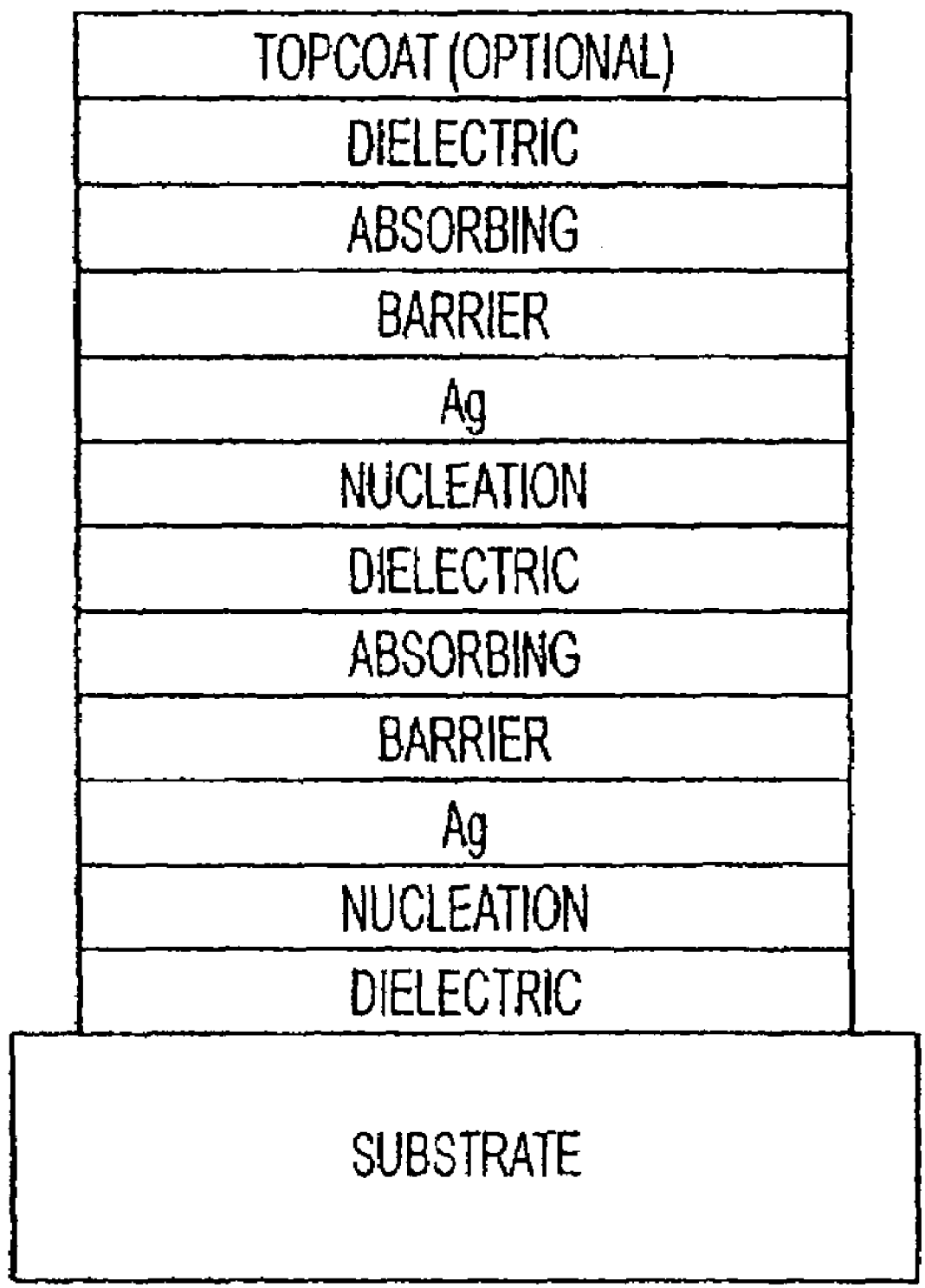
FIG. 2 depicts an alternate embodiment of an aesthetically appealing low-emissivity stack, exhibiting low SHGC and enhanced mechanical and/or chemical durability, which includes nucleation layers for improving the properties of the Ag layers, in accordance with the present invention.

In the following detailed description, reference is made to various specific embodiments in which the invention may be practiced. These embodiments are described with sufficient detail to enable those skilled in the art to practice the invention, and it is to be understood that other embodiments may be employed, and that structural and logical changes may be made without departing from the spirit or scope of the present invention.

The present invention provides improved coatings that yield low emissivity stacks that have a low solar heat gain coefficient (SHGC), are aesthetically appealing, and exhibit equal or better chemical and mechanical durability than typical low emissivity stacks. Moreover, the invention provides products which are compatible with standard production methods. In particular, for example, shifting from a standard coater to a low-g coater would not require venting or other change in coater layout. Furthermore, glass substrates coated in accordance with embodiments of the invention surprisingly can be tempered or heat strengthened without the drawbacks typically seen when such processes are used in connection with low emissivity coatings.

The present invention achieves the desired properties through the introduction of at least one thin absorbing layer into the low emissivity stack. The introduction of the absorbing material decreases the overall light transmittance without increasing the light reflectance. Increased reflectance is problematic, particularly when it occurs on a pane facing the inside of a building. Tolerance for tempering can be enhanced by adjusting the thickness of the dielectric or absorbing layers or the nature of the absorbing layers.

In an aspect, the invention provides a low-emissivity stack, including a coating on a substrate, the coating comprising at least one absorbing layer. The low-emissivity stack is characterized by a solar heat gain coefficient (SHGC) that is less than about 0.34, preferably less than about 0.30. In various embodiments, the stack has a light transmittance of about 42% to about 46%. During tempering, the transmittance rises by about 1%. In additional embodiments, the stack has a transmittance color with a negative a* and a negative b*.

In another aspect, the present invention provides a low-emissivity coating on a substrate, the coating comprising, in order outward from the substrate a first dielectric layer; a first Ag layer; a first barrier layer; a first absorbing layer; a second dielectric layer; a second Ag layer; a second absorbing layer; a third dielectric layer; and optionally, a topcoat layer. Either the first absorbing layer or the second absorbing layer is optional, i.e., two such absorbing layers are not required. A second barrier layer between the second Ag layer and the second absorbing layer may be present. The substrate is preferably glass. In preferred embodiments, the two Ag layers are well balanced with a ratio Ag1/Ag2 of about 80% or higher. However, in alternate embodiments, the ratio may be as low as 50%. Having balanced Ag layers provides various advantages, in particular from a process point of view. Because the two targets erode at approximately the same rate, the length of a campaign can be maximized. When the second Ag is much thicker than the first one, for example, the coater must be vented early in the campaign, which has a strong negative impact on production cost. The invention also provides coatings as described above, but having a single Ag layer, rather than two or more Ag layers.

The absorbing layer is preferably inserted between the barrier protecting the Ag layer and the dielectric. The absorbing material can include a metal, an alloy, a silicide, an absorbing oxide, an absorbing gray metal, a nitride, or any other suitable material that achieves the desired effect. Preferred materials include, without limitation, Ti, TiN, Si, NiCr, NiCrOx, Cr, Zr, Mo, W, and ZrSi, nickel or chromium alloys, and transition metals, nitrides, subnitrides, and suboxides thereof, as well as silicides and aluminides. In preferred temperable and non-tempered embodiments, the absorbing material comprises NiCr. In embodiments which are not to be tempered, Ti works well as an absorbing material.

The appropriate choice of absorbing material also enables one of ordinary skill to control the transmittance color of the coated glass. A neutral color (a* and b* negative and well balanced are preferred—the minimal requirement being a negative a* value and a b* value that is lower than +2 for transmittance and glass side reflectance) is more aesthetically appealing than a stronger greenish or yellowish hue. A neutral transmittance is highly desirable because it maximizes the correct color rendering of the insulated glass unit (IGU) housing the glass. The present invention also makes it possible to obtain a bluish hue, if desirable.

Thus, certain materials in low-g designs have been found capable of lowering transmission of low-e coatings and allowing the stack color to be tuned to preferred colors. In the case of temperable coatings, the preferred materials also are thermally stable within the thin film stack. Many other materials can be used as alternatives to the absorbing materials recited above. Such materials are those which can be defined by a range of index of refraction (n) and extinction coefficients (k) that are suitable for performing this transmission lowering function. In a temperable low-g design, the absorbing layer will have the appropriate optical properties as well as additional thermal stability properties.

Figure 6A:
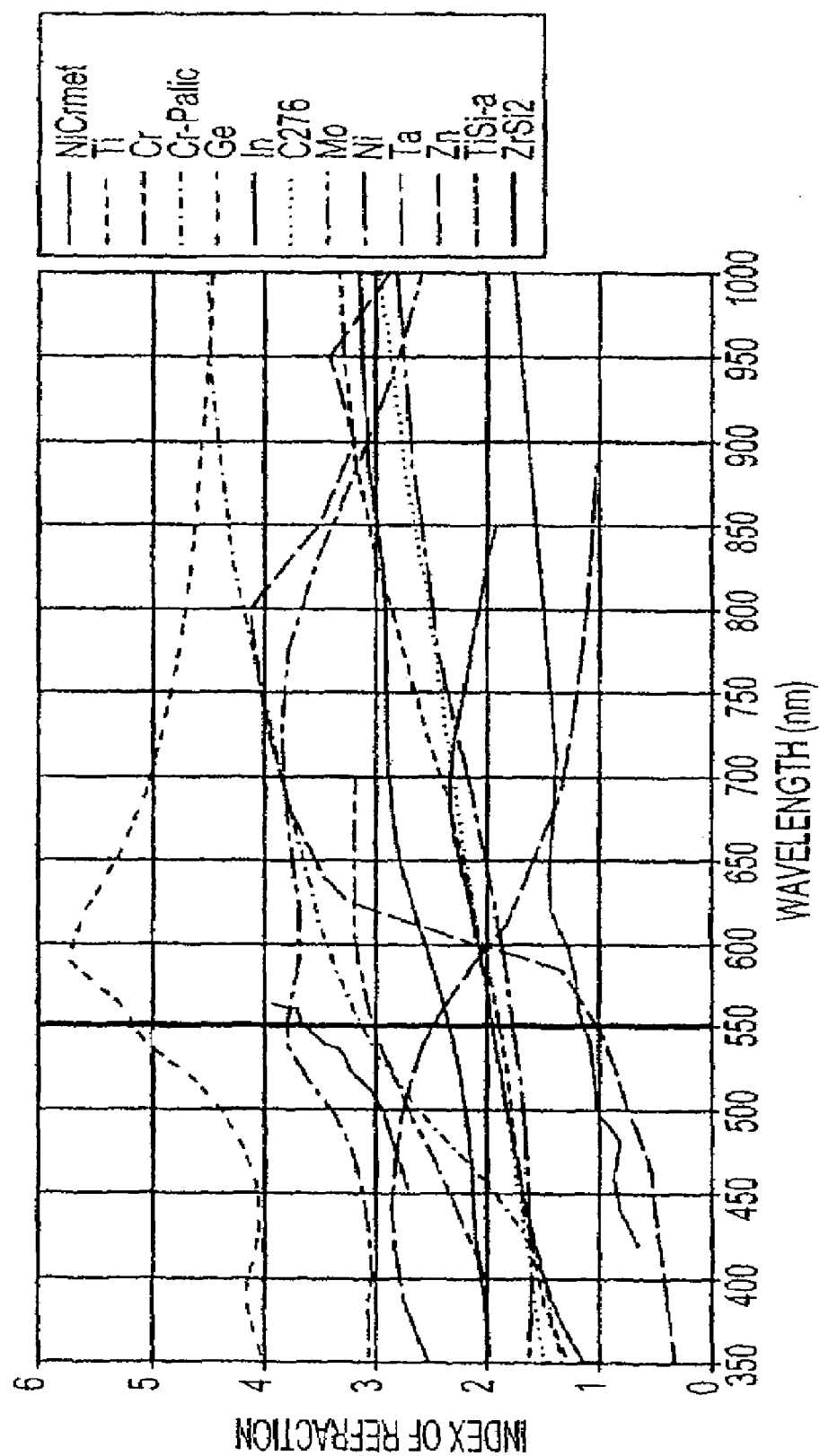
FIGS. 6A and 6B depict optical constant data for typical materials suitable for use as low-g absorbers in accordance with the invention.
Figure 6B:
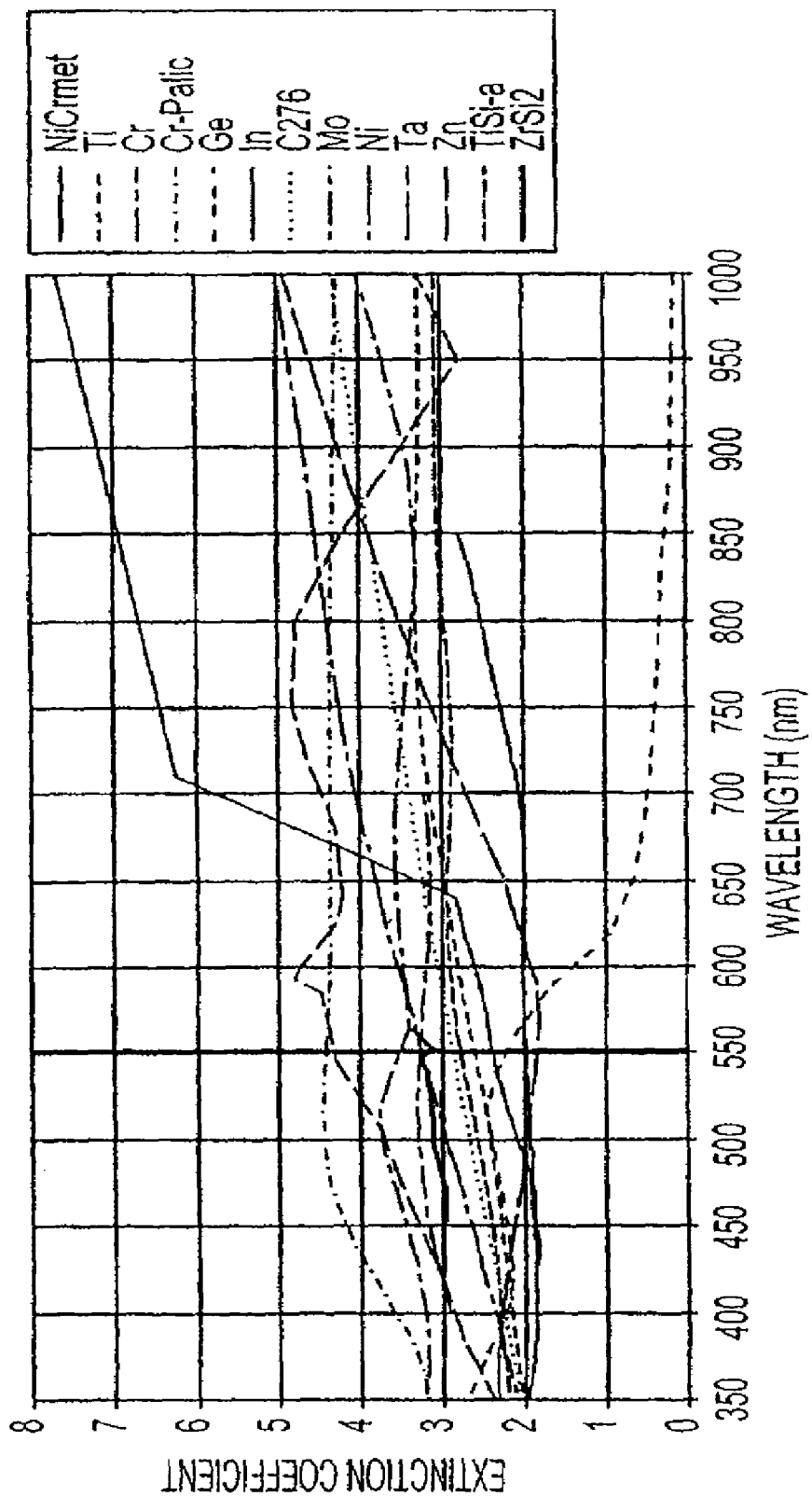

U.S. Pat. No. 6,416,872, incorporated into this application by reference in its entirety, refers to the use of a solar control design that contains a Fabry-Perot type thin film stack (metal/dielectric/metal). One of the metals is an infrared reflecting material (silver) and one is an optically absorbing material. The optically absorbing material is described in terms of a range of suitable optical constants. Preferred embodiments of the present invention similarly include Fabry-Perot stacks but comprise a general layer structure of metal/metal/dielectric/metal/metal or, more specifically, metal/thin suboxide absorber (barrier)/metal/dielectric/metal/thin suboxide absorber (barrier)/metal. In each of these cases, one metal of the metal/metal pair is preferably an infrared reflecting metal and the other is preferably an absorbing metallic material. The low-g absorbing metallic material may be described by optical constant ranges similar to those set forth in U.S. Pat. No. 6,416,872. Optical constants for typical materials optically suitable as low-g absorbers are plotted in FIGS. 6A and 6B. Based on the data presented in FIG. 6A, the preferred index of refraction range at a wavelength of 550 nm is from about 1 to about 5.5 for the metallic absorbers shown. Based on the data presented in FIG. 6B, the extinction coefficient range at a wavelength of 550 nm is from about 1.75 to about 4.5 for the metallic absorbers shown. An additional parameter that may be used in helping to define the range of suitable materials is that of an index plot which has a positive slope at 550 nm. This characteristic would distinguish the metallic materials from suboxides and nitrides which, when similarly plotted, typically have a negative slope at 550 nm.

In a preferred embodiment of the invention, the absorbing layer is introduced in a very specific location in the stack. This is to optimize the other properties which are important for the manufacturing and the processing of the coated glass, particularly the overall durability and the ease of production.

Each of the absorbing layers preferably has a thickness of about 0.1 nm to about 8 nm. If two absorbing layers are included, the first absorbing layer preferably is thicker than the second absorbing layer. The first absorbing layer preferably has a thickness of about 1 nm to about 6 nm, more preferably 1.5 nm to about 4 nm. The second absorbing layer preferably has a thickness of about 0.1 nm to about 5 nm, more preferably about 0.1 nm to about 4 nm. In an alternate embodiment, the first absorbing layer has a thickness of about 3 nm. In another alternate embodiment, the second absorbing layer has a thickness of about 0.5 nm. In another alternate embodiment, the first absorbing layer has a thickness of about 3.6 nm. In another alternate embodiment, the second absorbing layer has a thickness of about 0.1 nm.

In preferred embodiments, the dielectric layers each independently comprise an oxide, a nitride, or an oxy-nitride. When a dielectric layer comprises an oxide, the oxide is preferably sputtered from a Ti, a Zn, an Sn, a ZnSn alloy, or a Bi target. The oxide may comprise $Nb_2O_5$. The oxide may comprise up to about 20 wt %, preferably up to about 10 wt % of an element, such as Al or B, or similar such element. These dopants are commonly used to make silicon coater targets conductive. When a dielectric layer comprises a nitride or an oxy-nitride, the nitride or oxy-nitride can be a nitride or oxy-nitride of Si, SiAl, SiB, SiZr, or other suitable nitride or oxy-nitride that achieves the desired effect. Similarly, the nitride or oxy-nitride may comprise up to about 20 wt %, preferably up to about 10 wt % of an element, such as Al or B, or similar such element for making the coater target conductive.

Figure 3:
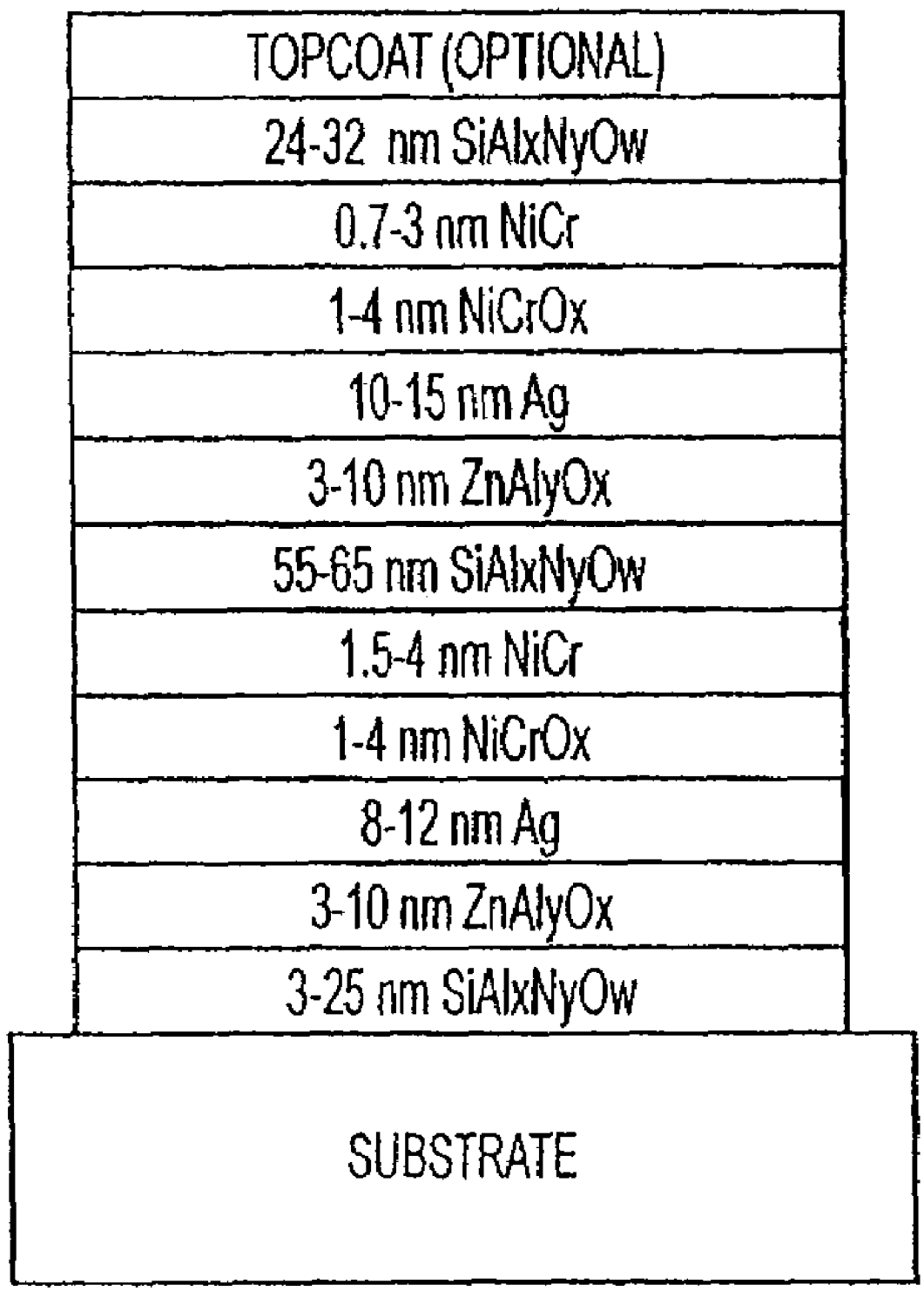
FIG. 3 depicts a further embodiment of an aesthetically appealing low-emissivity stack, exhibiting low SHGC and enhanced mechanical and/or chemical durability in accordance with the present invention.

In preferred embodiments that employ three primary dielectrics as depicted in, for example FIGS. 1 and 3, at least one of the dielectric layers is in a substoichiometric state. More preferably, all three such dielectrics (e.g., SiAlOxNy) are in a substoichiometric state. Various advantages can be achieved using such substoichiometric layers. For example:

1. The deposition rate from SiAl sputter targets is higher if the target surface chemistry is sub-stoichiometric. Sputter yield for a silicon rich surface is higher than for a surface comprised of more nitrided silicon. The higher deposition rate is advantageous for running a coater at higher speeds, which is more economical.

2. The higher index of the sub-stoichiometric nitrides allow for dielectric layers that have a lower physical thickness for the same optical thickness. Less target material is consumed when sub-stoichiometric layers are deposited and again, this allows the coater to run more efficiently.

3. The higher index dielectrics allow for greater flexibility in the optical characteristics in the low-e stack design. Desirable colors for transmission and reflection may be more easily achieved using higher index dielectrics than can be achieved using lower index, stoichiometric materials.

4. Sub-stoichiometric layers tend to have better chemical barrier properties than stoichiometric dielectrics. This allows for a more chemically stable and corrosion resistant low-e stack. Corrosive chemicals are less likely to reach the vulnerable silver layers.

5. The optical absorption of the sub-stoichiometric dielectrics helps reduce the transmission and raise the solar heat gain coefficient of the low-g stack. Sub-stoichiometric dielectrics tend to be optically absorbing in the visible and more transparent in the infrared. Thus, these materials reduce visible transmission but do not tend to interfere with the infrared reflective properties of the silver layers.

Metal absorber layers are optically absorbing in both visible and infrared. When metallic materials are used to reduce transmission in a low-g product, both visible transmission and infrared reflection are reduced. It is desirable for low-e products to have as high an infrared reflection as possible.

These advantages tend to occur for sub-stoichiometric oxides, oxy-nitrides, and nitrides which might be used in a low-e stack.

The silicon to aluminum ratio used in the preferred dielectrics in these low-g stacks is 10 weight % Al. Other Si:Al ratios may be used. In some embodiments, the atomic ratio of Si, O, and N is approximately $Si_4O_{0.4}N_5$. The top silicon oxynitride dielectric has a primary function as an optical interference layer, which contributes to the antireflection of the silver. The material is chosen, however, in part for its barrier properties and hardness. It contributes to the protection of the silver, both mechanically and chemically.

Figure 7:
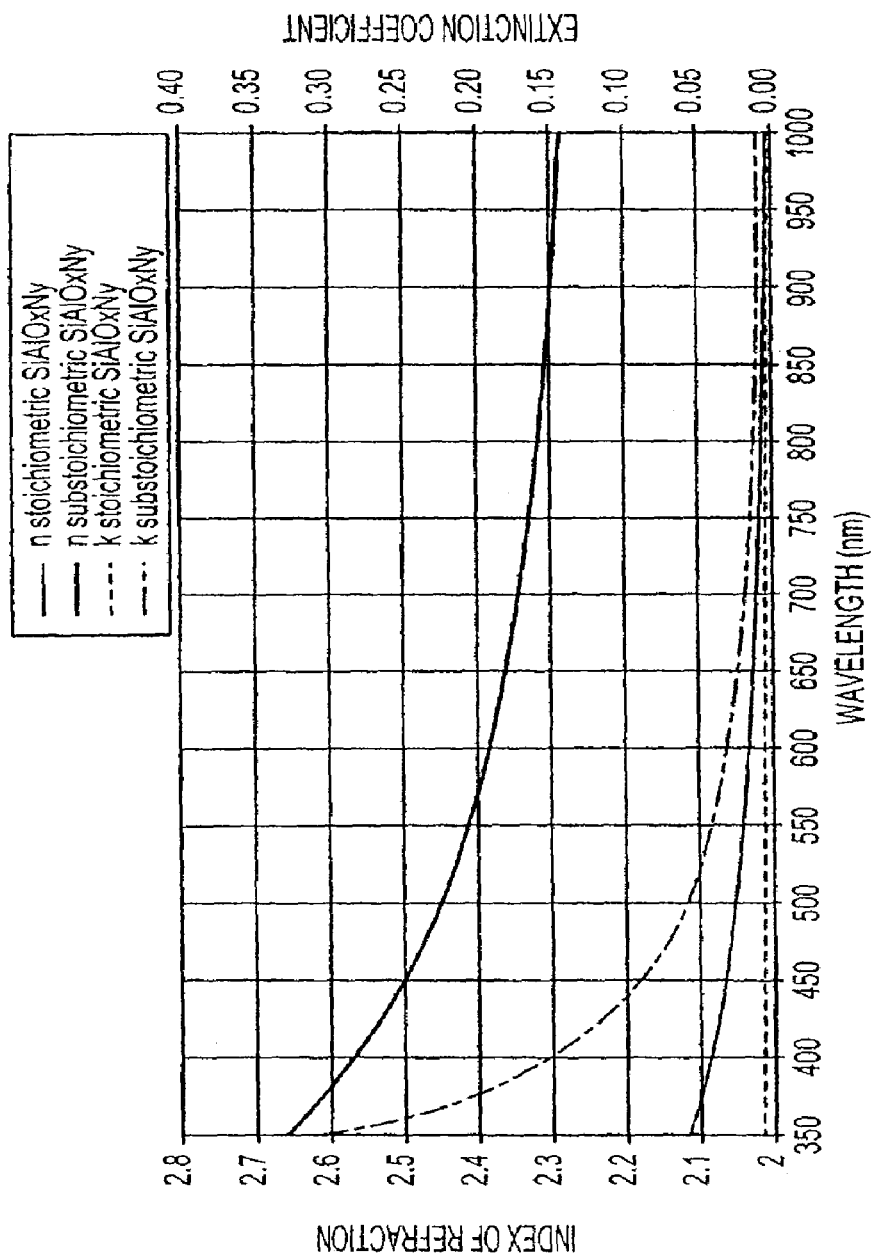
FIG. 7 provides graphical data illustrating index of refraction and extinction coefficients for two stoichiometries of SiAlOxNy.
Figure 8:
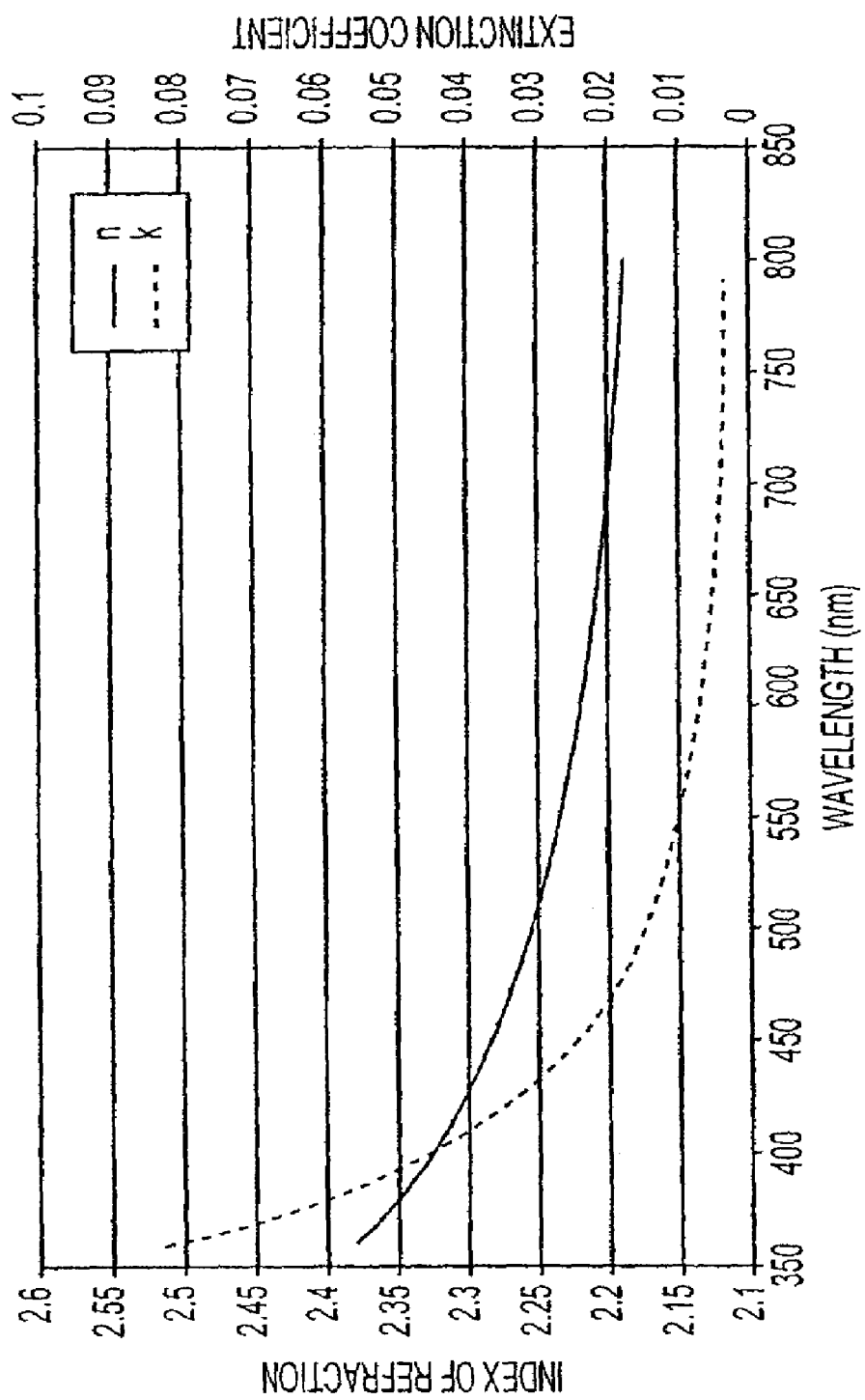
FIG. 8 provides graphical data illustrating preferred n & k values for SiAlOxNy in low-g stacks in accordance with the invention.

FIG. 7 depicts Index and Extinction coefficients for silicon oxy-nitride. The indices and extinction coefficients plotted on the graph show two stoichiometries of SiAlOxNy. These represent the approximate SiAlOxNy stoichiometry upper and lower limits that would be used for low-g coatings. Stoichiometry for the preferred embodiments typically would fall between these two extremes. FIG. 8 depicts approximate preferred n & k values for SiAlOxNy in low-g stacks.

In preferred embodiments, the dielectrics have indices of refraction at 550 nm that are between about 2.05 and about 2.4, more preferably between about 2.1 and about 2.3. In preferred embodiments, the dielectrics have extinction coefficients at 550 nm that are between about 0 and about 0.05, more preferably between about 0.01 and about 0.02.

In a preferred embodiment, the coating further comprises a nucleation layer between the first dielectric layer and the first Ag layer. In an alternate preferred embodiment, the coating further comprises a second nucleation layer between the second dielectric layer and the second Ag layer. The nucleation layers improve the properties of the Ag layer, and are typically based on Zn oxide, with up to about 15 wt % of other elements, such as, without limitation, Al, Sn, or a combination thereof. In preferred embodiments, the sputtering targets used to deposit ZnO contain approximately 1.5% Al, yielding layers that are ZnAlOx.

The barrier layer protects the Ag layer against attack of the plasma when sputtering the dielectric on top of it. It also improves the chemical durability by controlling the diffusion of aggressive species like $O_2$, O, $H_2O$, and Na+. In a preferred embodiment, the barrier is transparent. The barrier can comprise, without limitation, NiCr, NiCrOx, TiOx, NiCrNxOy, NiCrNx, Ti or other metal or metals, or subnitrates or suboxides thereof. A preferred barrier is NiCrOx. In such layers, particularly in the first (i.e., bottom) NiCrOx layer, it may comprise approximately 15 to 60 atomic percent oxygen. Preferably, the atomic percent oxygen is from 20% to 55%. Thermal durability for the temperable versions of this invention was improved when the first NiCrOx layer contained about 20 atomic percent oxygen.

The optional topcoat, if included, can have a positive impact on the chemical and/or mechanical stability. It can comprise, without limitation, C, SiSn, ZrSi, $SiSnO_2$ or silicides. It should be noted that this nomenclature is not intended to refer to the stoichiometry or atomic ratio of the different elements. For example, ZrSi is a sputtered material in which the Zr at % varies from 0 to 100% and the layer can be graded. This layer may oxidize upon heating. The topcoat typically has a contrasting nature compared to the underlying dielectric. If the dielectric is an oxide, the topcoat is preferably one of the above materials, or a nitride or an oxynitride, such as SiN or SixAlyNzOc. Alternatively, when the dielectric is a nitride or an oxynitride, the top coat is chosen from the above list, or can be an oxide (for instance $ZrO_2$, $ZrSiO_2$, $SnO_2$, or, ZrOxNy, $TiO_2$ or other similar substance, but not limited to the precise stoichiometric ratios recited herein). A preferred topcoat is carbon, and is used preferably in a temperable product during production. Such a coating, which is typically be sputtered, is preferably about 4-8 nm thick and burns off in the tempering process.

In an alternate embodiment, the invention provides a low-emissivity coating on a substrate, the coating comprising, in order outward from the substrate a first dielectric layer having a thickness up to about 25 nm, preferably up to about 23 nm; a first Ag layer having a thickness of about 8 nm to about 15 nm; a first barrier layer having a thickness of about 0.1 nm to about 4 nm; a first absorbing layer having a thickness of about 0.2 nm to about 8 nm; a second dielectric layer having a thickness of about 40 nm to about 75 nm; a second Ag layer having a thickness of about 8 nm to about 15 nm; optionally, a second barrier layer having a thickness of about 0.1 nm to about 4 nm; a second absorbing layer having a thickness of about 0.1 nm to about 8 nm; a third dielectric layer having a thickness of about 10 nm to about 40 nm; and optionally, a topcoat layer. In a further embodiment, the coating comprises a nucleation layer between the first dielectric layer and the first Ag layer, the nucleation layer having a thickness of about 2 nm to about 11 nm. In a still further embodiment, the coating comprises a second nucleation layer between the second dielectric layer and the second Ag layer, the second nucleation layer having a thickness of about 2 nm to about 11 nm. A stack having a first dielectric layer with a thickness of about 23 nm is particularly suitable for tempering.

In a still further embodiment, the present invention provides a low-emissivity coating on a substrate, the coating comprising, in order outward from the substrate a first dielectric layer comprising $SiAl_xN_yO_w$ and having a thickness of about 3 nm to about 25 nm; a first nucleation layer comprising ZnAlyOx and having a thickness of about 3 nm to about 11 nm; a first Ag layer having a thickness of about 8 nm to about 12 nm; a first barrier layer comprising NiCrOx and having a thickness of about 1 nm to about 4 nm; a first absorbing layer comprising NiCr and having a thickness of about 1.5 nm to about 4 nm; a second dielectric layer comprising $SiAl_xN_yO_w$ and having a thickness of about 55 nm to about 75 nm; a second nucleation layer comprising ZnAlyOx and having a thickness of about 3 nm to about 10 nm; a second Ag layer having a thickness of about 10 nm to about 15 nm; optionally, a second barrier layer comprising NiCrOx and having a thickness of about 2 nm to about 4 nm; a second absorbing layer comprising NiCr and having a thickness of about 0.7 nm to about 2.2 nm; a third dielectric layer comprising $SiAl_xN_yO_w$ and having a thickness of about 24 nm to about 40 nm; and optionally, a topcoat layer. In preferred embodiments, the second barrier layer comprising $NiCrO_x$ is absent, so that the second absorbing layer is deposited directly on the second Ag layer. As an alternative to the NiCr metal in the second absorbing layer, co-sputtered NiCr and Chromium, a NiCr/Cr bilayer, or any absorbing gray metal or alloy may be used. Further alternatives include, without limitation, a nichrome alloy comprising any Ni:Cr ratio, a NiCr layer in which the Ni:Cr ratio is graded, a NiCr layer reacted with nitrogen to form NiCrNx, and a dual layer optical absorber comprising NiCr/NiCr, wherein either metal may be any ratio of Ni and Cr.

Figure 9:
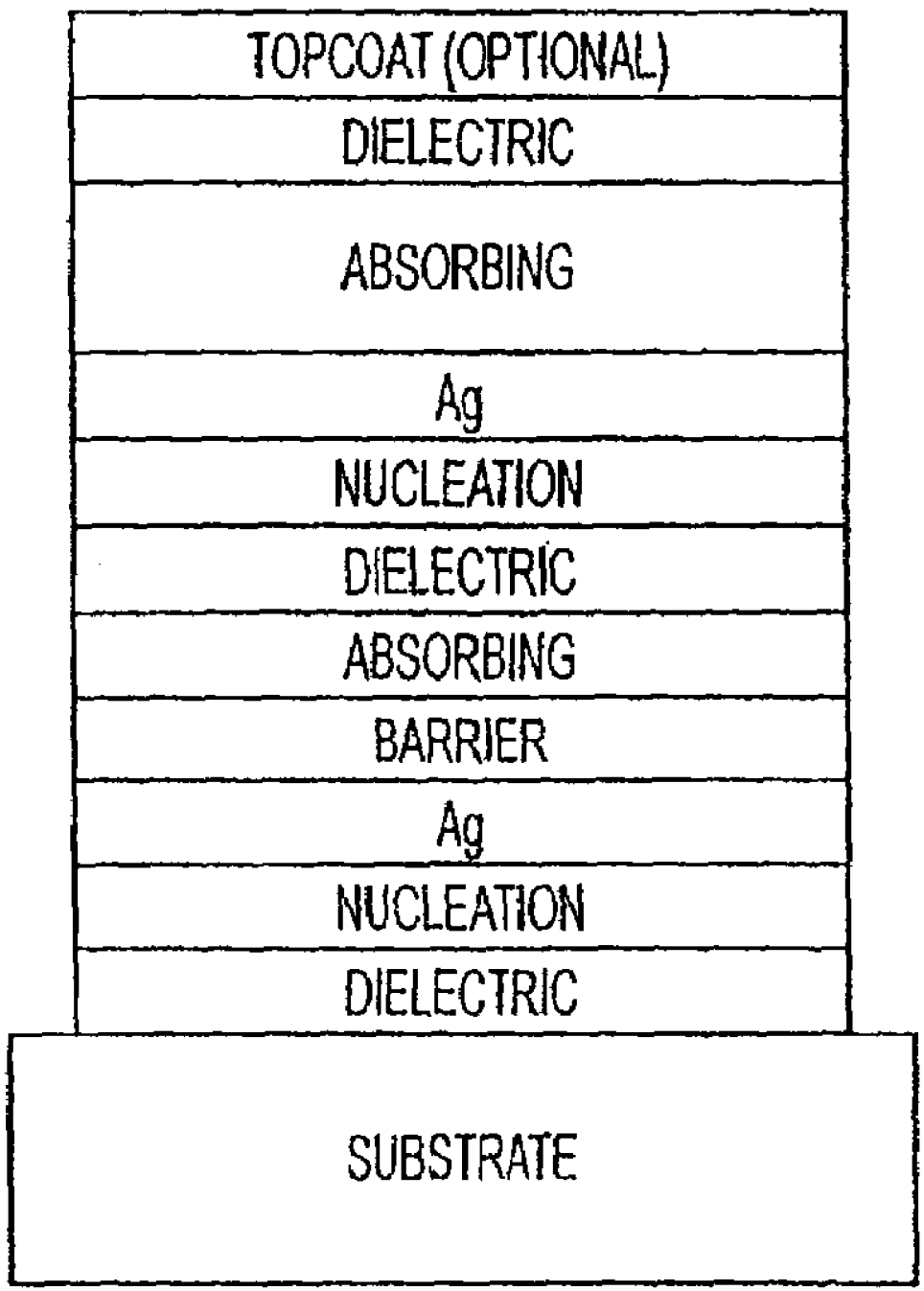
FIG. 9 depicts an alternate embodiment of an aesthetically appealing low-emissivity stack, exhibiting low SHGC and enhanced mechanical and/or chemical durability in accordance with the present invention.
Figure 10:
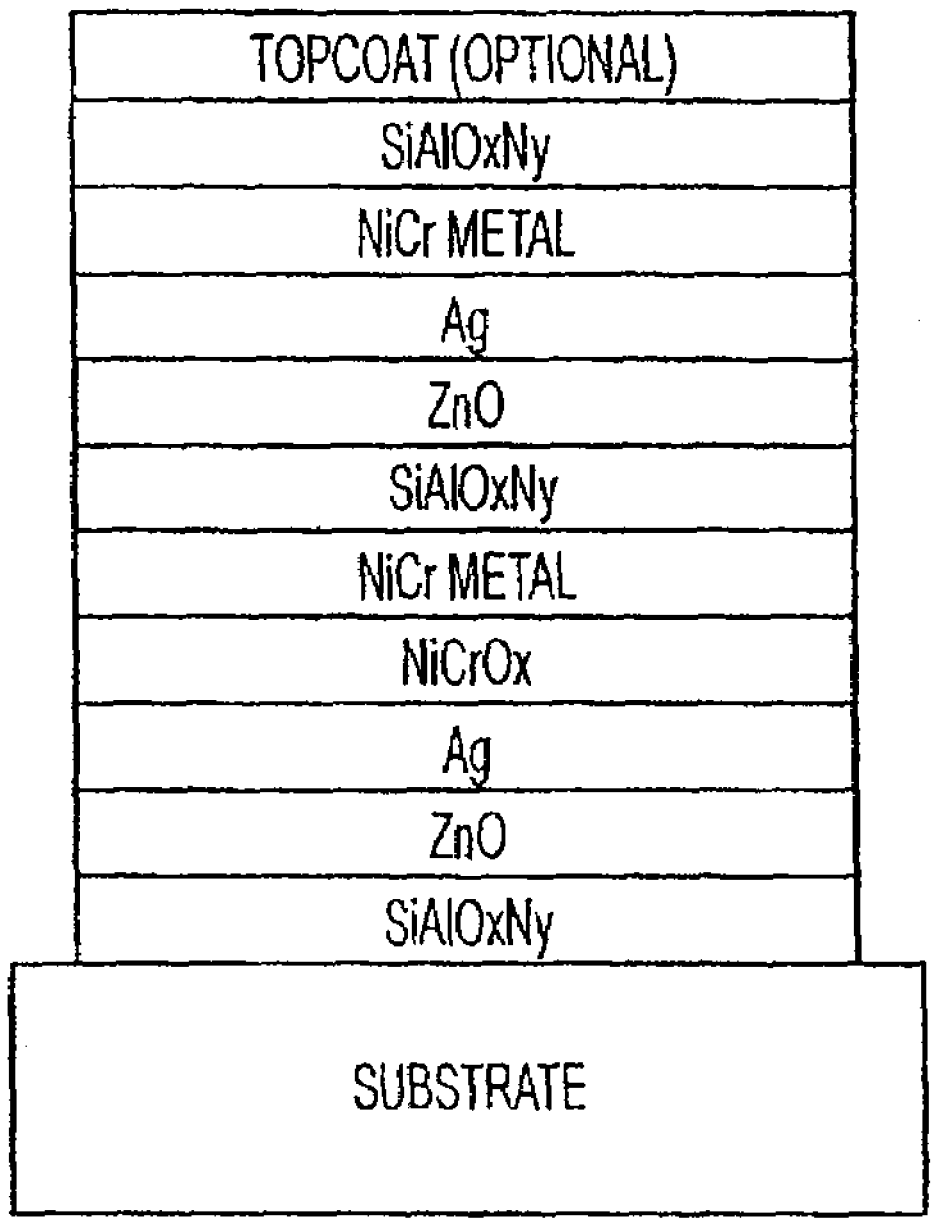
FIG. 10 depicts a further embodiment of an aesthetically appealing low-emissivity stack, exhibiting low SHGC and enhanced mechanical and/or chemical durability in accordance with the present invention.

In a further embodiment, the present invention provides, as illustrated in FIG. 9, for example, a low-emissivity coating on a substrate, the coating comprising, in order outward from the substrate a first dielectric layer; a first nucleation layer; a first Ag layer; a first barrier layer; a first optical absorbing layer; a second dielectric layer; a second nucleation layer; a second Ag layer; a second optical absorbing layer; a third dielectric layer; and optionally, a topcoat layer, preferably scratch resistant. Layer thicknesses are as described herein. In a preferred embodiment, as illustrated in FIG. 10, for example, the coating comprises, in order outward from the substrate, SiAlOxNy/ZnO/Ag/NiCrOx/NiCr metal/SiAlOxNy/ZnO/Ag/NiCr metal/SiAlOxNy/optional topcoat. Therefore, in this embodiment, a second NiCr metal absorbing layer is deposited directly on the second Ag layer. This embodiment may be tempered or heat strengthened without such tempering or heat strengthening causing degradation in the stack layers or in the optical qualities of the coated substrate or causing the other drawbacks typically seen when such processes are used in connection with low emissivity coatings. In addition to improved temperability, this configuration (in which the second absorbing layer is directly deposited on the second Ag layer) exhibits improved mechanical durability. It has been noted also that color appears to be easier to tune to preferred setpoints with this preferred embodiment. As an alternative to the NiCr metal in the second absorbing layer, co-sputtered NiCr and Chromium, a NiCr/Cr bilayer, or any absorbing gray metal, or alloy may be used. Further alternatives include, without limitation, a nichrome alloy comprising any Ni:Cr ratio, a NiCr layer in which the Ni:Cr ratio is graded, a NiCr layer reacted with nitrogen to form NiCrNx, and a dual layer optical absorber comprising NiCr/NiCr, wherein either metal may be any ratio of Ni and Cr.

The invention further provides a low-emissivity stack comprising at least one absorbing layer, the low-emissivity stack being characterized by a solar heat gain coefficient (SHGC) that is less than about 0.34, preferably less than about 0.30. In alternate embodiments, the stack includes a glass substrate having a thickness of about ⅛ inch and exhibiting a light transmittance of about 42% to about 46%. In alternate embodiments, the stack has a transmittance color with a negative a* and a negative b*.

The invention further provides methods of making low-emissivity stacks having a low SHGC as described, the methods including depositing on a substrate the coatings described herein. The layers in the multilayer coatings of the present invention can be deposited by conventional physical and chemical vapor deposition techniques. The details of these techniques are well known in the art and will not be repeated here. Suitable deposition techniques include sputtering methods. Suitable sputtering methods include DC sputtering, using metallic targets, and AC and RF sputtering, using metallic and non-metallic targets. All can utilize magnetron sputtering. The sputtering can be in an inert gas, or can be carried out reactively in reactive gas. The total gas pressure can be maintained in a range from $5 \times 10^{-4}$ to $8 \times 10^{-2}$ mbar, preferably from $1 \times 10^{-3}$ to $1 \times 10^{-2}$ mbar. Sputtering voltages can be in a range from 200 to 1200 V, preferably 250 to 1000 V. Dynamic deposition rates can be in a range of from 25 to 4000 nm-mm$^2$/W-sec, preferably 30 to 700 nm-mm$^2$/W-sec. Coaters manufactured by Leybold Systems GmbH with model numbers Typ A 2540 Z 5 H/13-22 and Typ A 2540 Z 5 H/20-29 are suitable for sputter depositing the multilayer coatings of the present invention.

As indicated, the multiple layers of silver in the low emissivity coating of the present invention provide greater efficiency in reflecting IR radiation, and a sharper cut-off between transmitted and reflected wavelengths, than is possible with a single layer of silver.

The multilayer coating of the present invention is deposited on and is mechanically supported by the substrate. The substrate surface serves as a template for the coating, and influences the surface topography of the coating. To maximize transmission of visible light, preferably the surface of the substrate has a roughness less than the wavelength of the light. Such a smooth surface can be formed by, e.g., solidifying a melt of the substrate. The substrate can be any material having an emissivity that can be lowered by the multilayer coating of the present invention. For architectural and automotive applications, the substrate is preferably a material which has superior structural properties and minimum absorption in the visible and near-infrared spectra regions where the solar energy is concentrated. Crystalline quartz, fused silica, soda-lime silicate glass and plastics, e.g., polycarbonates and acrylates, are all preferred substrate materials.

As used in the present specification, the language "deposited onto" or "deposited on" means that the substance is directly or indirectly applied above the referenced layer. If applied indirectly, one or more layers may intervene. Furthermore, unless otherwise indicated, in describing coatings of the present invention by use of the format "[substance 1]/[substance 2]/[substance 3]/ . . . " or the format "a first [substance 1] layer; a first [substance 2] layer; a second [substance 1] layer; a second [substance 2] layer; . . . ", or the like, it is meant that each successive substance is directly or indirectly deposited onto the preceding substance.

Figure 5:
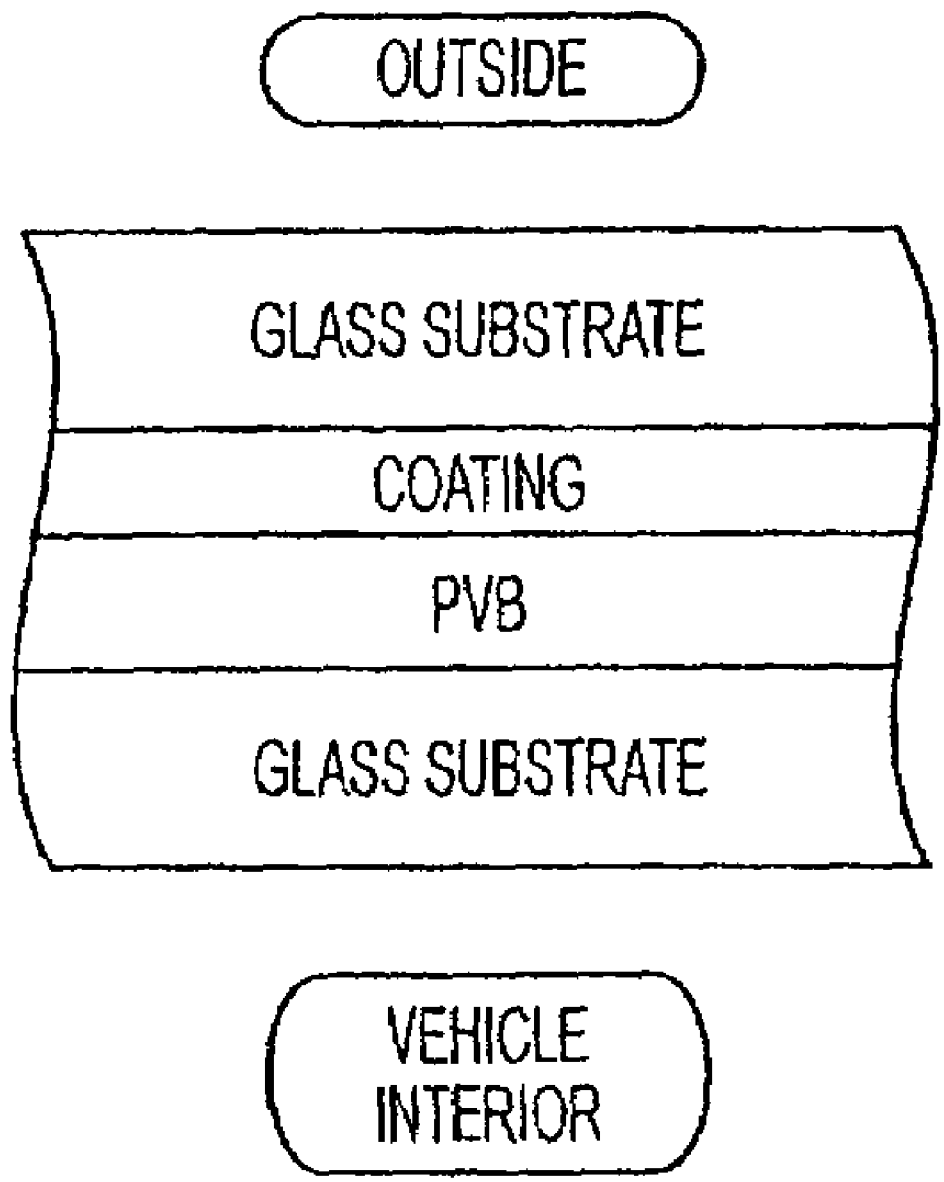
FIG. 5 depicts an embodiment of a low-e stack for use in an automotive or other vehicle, including two glass substrates, a PVB layer, and a coating in accordance with the present invention.

Coated articles according to different embodiments of this invention may be used in the context of architectural windows (e.g., IG units), automotive windows, or any other suitable application. Coated articles described herein may or may not be heat treated in different embodiments of this invention. FIG. 5 depicts an embodiment of the invention suitable for use in an automotive or other vehicle application (such as a windshield or similar laminate). In the illustrated embodiment, a coating in accordance with the present invention is included in a stack which also comprises two glass substrates and a polyvinyl butyral (PVB) layer. The coating can be on the first sheet or the second sheet, provided it is facing the PVB.

Certain terms are prevalently used in the glass coating art, particularly when defining the properties and solar management characteristics of coated glass. Such terms are used herein in accordance with their well known meaning. For example, as used herein:

Intensity of reflected visible wavelength light, i.e. "reflectance" is defined by its percentage and is reported as $R_x$ Y or $R_x$ (i.e. the RY value refers to photopic reflectance or in the case of TY photopic transmittance), wherein "X" is either "G" for glass side or "F" for film side. "Glass side" (e.g. "G") means, as viewed from the side of the glass substrate opposite that on which the coating resides, while "film side" (i.e. "F") means, as viewed from the side of the glass substrate on which the coating resides.

Color characteristics are measured and reported herein using the CIE LAB 1976 a*, b* coordinates and scale (i.e. the CIE 1976 a*b* diagram, D65 10 degree observer), wherein:

L* is (CIE 1976) lightness units a* is (CIE 1976) red-green units b* is (CIE 1976) yellow-blue units.

Other similar coordinates may be equivalently used such as by the subscript "h" to signify the conventional use of the Hunter method (or units) Ill. C, 10° observer, or the CIE LUV u*v* coordinates. These scales are defined herein according to ASTM D-2244-93 "Standard Test Method for Calculation of Color Differences From Instrumentally Measured Color Coordinates" Sep. 15, 1993 as augmented by ASTM E-308-95, Annual Book of ASTM Standards, Vol. 06.01 "Standard Method for Computing the Colors of Objects by 10 Using the CIE System" and/or as reported in IES LIGHTING HANDBOOK 1981 Reference Volume.

The terms "emissivity" (or emittance) and "transmittance" are well understood in the art and are used herein according to their well known meaning. Thus, for example, the term "transmittance" herein means solar transmittance, which is made up of visible light transmittance (TY of $T_{vis}$), infrared energy transmittance ($T_{IR}$), and ultraviolet light transmittance ($T_{uv}$) Total solar energy transmittance (TS or $T_{solar}$) can be characterized as a weighted average of these other values. With respect to these transmittances, visible transmittance may be characterized for architectural purposes by the standard Ill. D65 10 degree technique; while visible transmittance may be characterized for automotive purposes by the standard Ill. A 2 degree technique (for these techniques, see for example ASTM E-308-95, incorporated herein by reference). For purposes of emissivity a particular infrared range (i.e. 2,500-40,000 nm) is employed.

"Emissivity" (or emittance) ("E" or "e") is a measure, or characteristic of both absorption and reflectance of light at given wavelengths. It is usually represented by the formula: E=1−Reflectance$_{film}$. For architectural purposes, emissivity values become quite important in the so-called "mid-range", sometimes also called the "far range" of the infrared spectrum, i.e. about 2,500-40,000 nm., for example, as specified by the WINDOW 4.1 program, LBL-35298 (1994) by Lawrence Berkeley Laboratories, as referenced below. The term "emissivity" as used herein, is thus used to refer to emissivity values measured in this infrared range as specified by ASTM Standard E 1585-93 entitled "Standard Test Method for Measuring and Calculating Emittance of Architectural Flat Glass Products Using Radiometric Measurements". This Standard, and its provisions, are incorporated herein by reference. In this Standard, emissivity is reported as hemispherical emissivity ($E_h$) and normal emissivity ($E_n$).

The actual accumulation of data for measurement of such emissivity values is conventional and may be done by using, for example, a Beckman Model 4260 spectrophotometer with "VW" attachment (Beckman Scientific Inst. Corp.). This spectrophotometer measures reflectance versus wavelength, and from this, emissivity is calculated using the aforesaid ASTM Standard 1585-93.

The term $R_{solar}$ refers to total solar energy reflectance (glass side herein), and is a weighted average of IR reflectance, visible reflectance, and UV reflectance. This term may be calculated in accordance with the known DIN 410 and ISO 13837 (December 1998) Table 1, p. 22 for automotive applications, and the known ASHRAE 142 standard for architectural applications, both of which are incorporated herein by reference.

"Haze" is defined as follows. Light diffused in many directions causes a loss in contrast. The term "haze" is defined herein in accordance with ASTM D 1003 which defines haze as that percentage of light which in passing through deviates from the incident beam greater than 2.5 degrees on the average. "Haze" may be measured herein by a Byk Gardner haze meter (all haze values herein are measured by such a haze meter and are given as a percentage of light scattered). Another term employed herein is "sheet resistance". Sheet resistance ($R_s$) is a well known term in the art and is used herein in accordance with its well known meaning. It is here reported in ohms per square units. Generally speaking, this term refers to the resistance in ohms for any square of a layer system on a glass substrate to an electric current passed through the layer system. Sheet resistance is an indication of how well the layer or layer system is reflecting infrared energy, and is thus often used along with emissivity as a measure of this characteristic. "Sheet resistance" may for example be conveniently measured by using a 4-point probe ohmmeter, such as a dispensable 4-point resistivity probe with a Magnetron Instruments Corp. head, Model M-800 produced by Signatone Corp. of Santa Clara, Calif.

"Chemical durability" or "chemically durable" is used herein synonymously with the term of art "chemically resistant" or "chemical stability". Chemical durability is determined by an immersion test wherein a 2"×5" or 2"×2" sample of a coated glass substrate is immersed in about 500 ml of a solution containing 4.05% NaCl and 1.5% $H_2O_2$ for 20 minutes at about 36° C. Chemical durability can also be determined by the Cleveland test or the climatic chamber test, as follows.

Cleveland Chamber Set Up

Samples are cut down to 4"×12" or 6"×12" for this test. The water is heated to 50° C.+/−2° C. and the room temperature kept at 23° C.+/−3° C. (73° F.+/−5° F.). Samples are placed film side down over the heated water bath. Within a few minutes of exposure the samples are covered with a thick layer of condensed water. As time progresses, the water drips down the face of the sample and new condensation forms on the sample. Condensed water is present on the samples for the entire duration of the test.

Climatic Chamber Set Up

Samples are cut down to 4"×6" for this test. For the static humidity test, humidity is held a 98% relative humidity (RH) while the temperature cycles between 45° and 55° C. in one hour.

Measurements Performed

Samples are removed after 1, 3, and 7 days of exposure for measurements. Haze, emissivity, and film side reflection are measured.

To calculate delta haze:

Delta Haze=Post-Test Haze−Pre-Test Haze

To calculate delta E:

Delta E=(delta L*^2+delta a*^2+delta b*^2)½, where the delta L, a*, and b* are pre-test minus post-test measurements.

To calculate percent change in emissivity use this formula:

Change in emissivity=($E$post-test−$E$pre-test)/($E$glass−$E$pre-test).

"Mechanical durabilility" as used herein is defined by the following test. The test uses a Erichsen Model 494 brush tester and Scotch Brite 7448 abrasive (made from SiC grit adhered to fibers of a rectangular pad) wherein a standard weight brush or a modified brush holder is used to hold the abrasive against the sample. 100-500 dry or wet strokes are made using the brush or brush holder. Damage caused by scratching can be measured in three ways: variation of emissivity, haze and E for film side reflectance. This test can be combined with the immersion test or heat treatment to make the scratches more visible. Good results can be produced using 200 dry strokes with a 135 g. load on the sample. The number of strokes could be decreased or a less aggressive abrasive could be used if necessary. This is one of the advantages of this test, depending on the level of discrimination needed between the samples, the load and/or the number of strokes can be adjusted. A more aggressive test could be run for better ranking. The repeatability of the test can be checked by running multiple samples of the same film over a specified period.

The terms "heat treatment", "heat treated" and "heat treating" as used herein mean heating the article to a temperature sufficient to enable thermal tempering, bending, or heat strengthening of the glass inclusive article. This definition includes, for example, heating a coated article to a temperature of at least about 1100 degrees F. (e.g., to a temperature of from about 550 degrees C. to 700 degrees C.) for a sufficient period to enable tempering, heat strengthening, or bending.

The term "Solar Heat Gain Coefficient (or SHGC)" ("g") is well known in the art and refers to a measure of the total solar heat gain through a window system relative to the incident solar radiation.

Unless otherwise indicated, the additional terms listed below are intended to have the following meanings in this specification.

| | |
|---|---|
| Ag | silver |
| $TiO_2$ | titanium dioxide |
| $NiCrO_x$ | an alloy or mixture containing nickel oxide and chromium oxide. Oxidation states may vary from stoichiometric to substoichiometric. |
| NiCr | an alloy or mixture containing nickel and chromium |
| $SiAlN_x$ | reactively sputtered silicon aluminum nitride. Sputtering target typically contains 2-20 weight % Al. The sputtering gas is a mixture of Ar and $N_2$. Dependant on the gas mixture and the sputtering power, the material is more or less absorbing. |
| $SiAlN_xO_y$ | Si(N); reactively sputtered silicon aluminum nitride. Sputtering target typically contains 2-20 weight % Al. The sputtering gas is a mixture of Ar, |

-continued

| | |
|---|---|
| | $N_2$ and $O_2$. Dependant on the gas mixture and the sputtering power, the material is more or less absorbing. |
| $ZnAl_yO_x$ | reactively sputtered Zn aluminum oxide. Sputtering target typically contains 2-20 weight % Al. The sputtering gas is a mixture of Ar and $O_2$. |
| $Zn_xSn_yAl_zO_w$ | reactively sputtered zinc tin (aluminum) oxide. Sputtering target typically a zinc tin alloy with optional Al doping. The zinc tin alloy covers a wide range from zinc rich to tin rich alloys. The sputtering gas is a mixture of Ar and $O_2$. |
| Zr | zirconium |
| optical coating | one or more coatings applied to a substrate which together affect the optical properties of the substrate |
| low-e stack | transparent substrate with a low heat emissivity optical coating consisting of one or more layers |
| barrier | layer deposited to protect another layer during processing, may provide better adhesion of upper layers, may or may not be present after processing. |
| layer | a thickness of material having a function and chemical composition bounded on each side by an interface with another thickness of material having a different function and/or chemical composition, deposited layers may or may not be present after processing due to reactions during processing. |
| co-sputtering | Simultaneous sputtering onto a substrate from two or more separate sputtering targets of two or more different materials. The resulting deposited coating may consist of a reaction product of the different materials, an un-reacted mixture of the two target materials or both. |
| Intermetallic compound | A certain phase in an alloy system composed of specific stoichiometric proportions of two or more metallic elements. The metal elements are electron or interstitial bonded rather existing in a solid solution typical of standard alloys. Intermetallics often have distinctly different properties from the elemental constituents particularly increased hardness or brittleness. The increased hardness contributes to their superior scratch resistance over most standard metals or metal alloys. |
| brush | This term, as used in the Example sets provided herein, refers (unless otherwise noted) to a wet brush durability test carried out on an Erichsen brush tester (Model 494) using a nylon brush (Order number 0068.02.32. The brush weighs 450 grams. The individual bristle diameter is 0.3 mm. Bristles are arranged in groups with a diameter of 4 mm). The test is run for 1000 strokes (where one stroke is equal to a full cycle of one back and for motion of the brush). The samples are brushed on the coated side and submerged in de-ionized water during the brushing procedure. |

In various embodiments, the low emissivity stacks of the present invention exhibit the following independent characteristics: transmitted Y of about 30 to about 60, preferably about 35 to about 55 and most preferably about 40 to about 50; an transmitted a* value which is negative, most preferably about −1 to about −6; preferably a b* value which is negative, most preferably about 0 to about −6; RgY of about 8 to about 20, more preferably about 10 to about 18, most preferably about 11 to about 17; Rga* which is negative, most preferably about −1 to about −7; preferably an Rgb* value that is negative, most preferably −1 to about −7; RfY between about 2 and about 12, more preferably about 2 to about 10, and most preferably about 2 to about 8; Rfa* which is negative, most preferably about −2 to about −20; preferably an Rfb* of about −10 to about +10, most preferably about −6 to about +6; and a SHGC of about 0.10 to 0.30, up to about 0.34, more preferably about 0.15 to about 0.28, most preferably about 0.20 to about 0.25.

To further illustrate the invention, the following non-limiting examples are also provided:

Example 1

Figure 4:
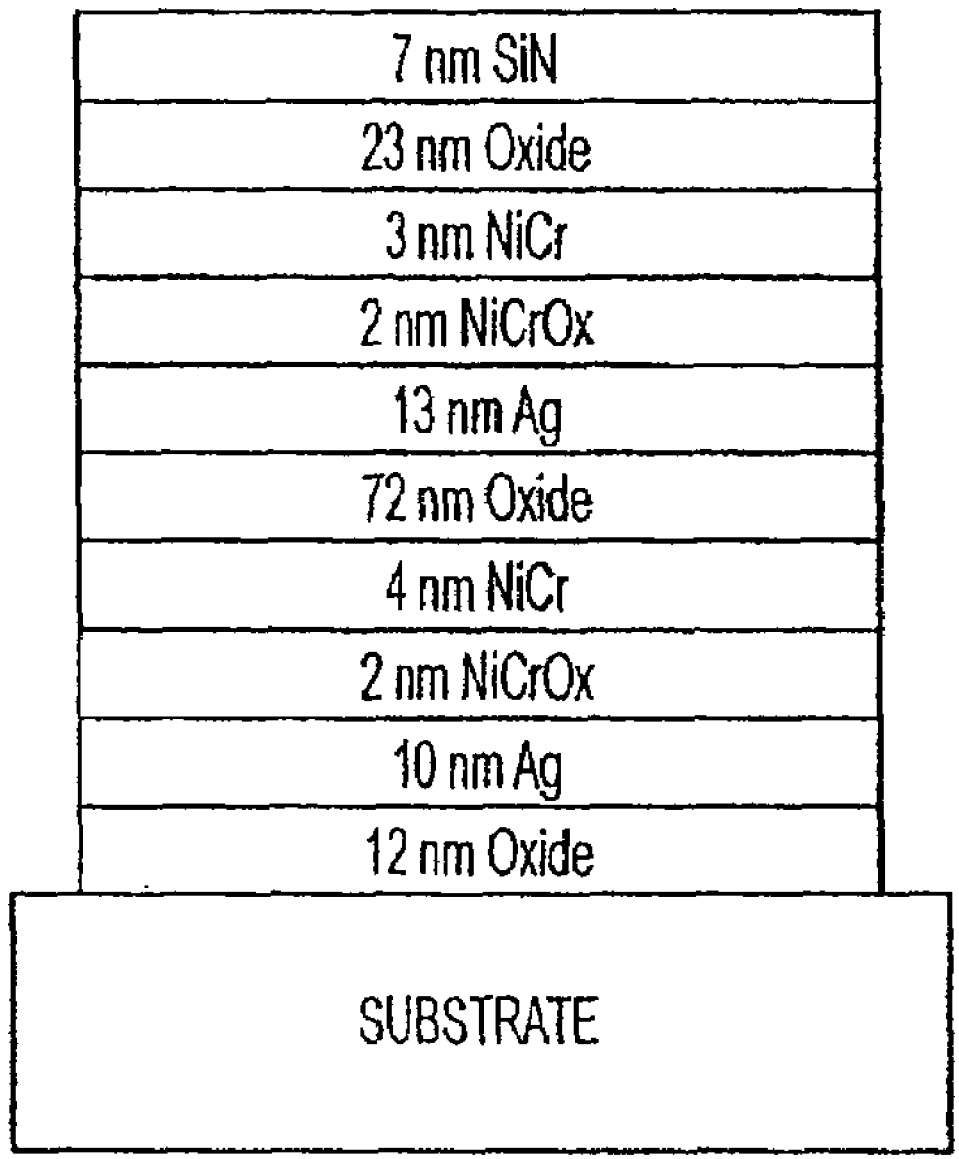
FIG. 4 depicts a still further embodiment of an aesthetically appealing low-emissivity stack, exhibiting low SHGC and enhanced mechanical and/or chemical durability in accordance with the present invention.

In the present example, depicted in FIG. 4, a low-e coating is deposited on a glass substrate to form a stack having the following configuration: Glass/12 nm oxide/10 nm Ag/2 nm NiCrOx/4 nm NiCr/72 nm oxide/13 nm Ag/2 nm NiCrOx/3 nm NiCr/23 nm oxide/7 nm SiN. The oxide can be sputtered from a Ti, Zn, Sn, ZnSn alloy, or Bi target The oxide may comprise $Nb_2O_5$. The oxide may comprise up to about 20 wt %, preferably up to about 10 wt % of an element, such as Al or B, or similar such element to make the coater target conductive. The SiN topcoat is optional. This exemplified coating has an appealing transmittance color with a* and b* negative. The SHGC is below 0.30. The coating has an acceptable mechanical and chemical durability.

Example 2

In the present example, a low-e coating is deposited on a glass substrate to form a stack having the following configuration: about ⅛ inch Glass/0-15 nm dielectric/2-10 nm nucleation layer/8-15 nm Ag/0.1-4 nm barrier/0.2-8 nm Absorbing layer/40-75 nm dielectric/2-10 nm nucleation layer/8-18 nm Ag/0.1-4 nm barrier/0.2-8 nm Absorbing layer/10-40 nm dielectric/topcoat. The dielectric can be an oxide (as in example 1) or a nitride or an oxy-nitride of Si, SiAl, SiB, SiZr and it may contain up to about 20 wt %, preferably up to about 10 wt % of an element, such as Al and B, to make the coater target conductive. The nucleation layer improves the properties of the Ag layer and is typically based on Zn oxide with up to 15 wt % of other elements such as Al, Sn or a combination thereof.

The barrier protects the Ag against the attack of the plasma when sputtering the dielectric atop. It also improves the chemical durability by controlling the diffusion of aggressive species such as $O_2$, O, $H_2O$, and Na+. Suitable barriers include, without limitation, NiCr, NiCrOx, NiCrNxOy, TiOx, Ti and other metals.

As indicated, the topcoat is optional. When included, it can have a positive impact on the chemical and mechanical stability. A suitable topcoat includes but is not limited to C, ZrSi, or silicides. Typically, the topcoat has a contrasting nature compared to the underlying dielectric. If the dielectric is an oxide, the topcoat will be one of the materials described above or a nitride or an oxy-nitride (for instance SiN or SixAlyNzOc). In the alternative, when the dielectric is a nitride or an oxynitride, the top coat can advantageously be an oxide, such as, without limitation, $ZrO_2$, $ZrSiO_2$, $SnO_2$, $ZrOxNy$, or $TiO_2$.

Example 3

In the present example, a low-e coating is deposited on a glass substrate to form a stack having the following configuration: about ⅛ inch Glass/3-15 nm SiAlxNyOw/3-10 nm ZnAlyOx/8-12 nm Ag/1-4 nm NiCrOx/1.5-3.0 nm NiCr/55-65 nm SiAlxNyOw/3-10 nm ZnAlyOx/10-15 nm Ag/1-4 nm NiCrOx/0.7-2.2 nm NiCr/24-32 nm SiAlxNyOw/optional top coat. The top coat, if included, can be chosen from, but is not limited to 1-5 nm C, 1-10 nm of $ZrO_2$, or $ZrSiO_2$. The coating in the present example exhibits a light transmittance of about 42% to about 46%, as measured on an IGU, a SHGC below about 0.30, and the transmittance color is gray and can be adjusted for a green to a blue hue. The IGU includes ⅛" coated glass, with the coating in position 2, and ⅛" clear class, with a ½" gap. The coating has improved chemical and mechanical durability. The double layer NiCrOx/NiCr has a positive impact in achieving the sought after properties. Because of the specific location of the NiCr, the coating can be produced on an existing coater that is primarily dedicated to low-e coating. It does not require specific isolation of the NiCr sputtering target. A summary of the properties observed in the above exemplified stacks is provided in the table below:

|  | Example 1 | Example 2 | Example 3 |
|---|---|---|---|
| Aesthetics | neutral | neutral | neutral |
| SHGC | below .30 | below .30 | below .30 |
| Aesthetics | good | good | good |
| Angular stability | good | good | good |
| Humidity resitance | good | good | good |
| Chemical durability | good | good | good |
| Mechanical durability | good | good | good |

Example 4

The present Example represents a preferred non-tempered coating, with thickness data, in accordance with the invention. Thicknesses were measured with a DekTak Profilometer. In measuring the thicknesses, an initial thickness measurement was made on the entire stack. Subsequently, the top layer was turned off in the coater and the thickness of the stack minus the top SiAlOyNx layer was measured. This was repeated with layers turned off one at a time, until lastly, the bottom SiAlOyNx alone was measured. The accuracy of the measurements is approximately ±0.5 nm.

| LAYER | Individual layer thickness (nm) |
|---|---|
| top SiAlOxNy | 33.4 |
| top NiCr | 0.5 |
| Ag | 13.5 |
| ZnAlOx | 6.2 |
| mid SiAlOxNy | 68.2 |
| bot NiCr | 3.0 |
| NiCrOx | 1.3 |
| Ag | 10.6 |
| ZnAlOx | 9.0 |
| bot SiAlOxNy | 23.0 |

Example 5

The present Example represents a preferred temperable coating, which includes a carbon topcoat, in accordance with the invention. Thicknesses were measured with a DekTak Profilometer as in Example 4 above. In these measurements, the top SiAlOxNy and carbon topcoat thicknesses were not separated. The carbon is estimated to be approximately 5 nm thick, thereby making the top SiAlOxNy layer approximately 33 nm.

| LAYER | Individual layer thickness (nm) |
|---|---|
| top SiAlOxNy and carbon topcoat | 38.6 |
| top NiCr | 0.1 |
| Ag | 13.2 |
| ZnAlOx | 9.4 |
| mid SiAlOxNy | 67.4 |
| bot NiCr | 3.6 |
| NiCrOx | 1.0 |
| Ag | 9.8 |
| ZnAlOx | 10.7 |
| bot SiAlOxNy | 23.3 |

Example 6

The table below represents optical and electrical measurements taken of coatings in accordance with the invention. The "low-g A" product is an annealed product on which no heat treatment was carried out. The "low-g T" product is a temperable product, which includes a topcoat in accordance with the invention. "BB" represents measurements taken before tempering and "AB" represents measurements taken after tempering. "N/A" indicates no measurements were obtained during generation of this particular example.

|  | low-g A (no heat treatment done) | low-g T | |
|---|---|---|---|
|  | BB only | BB | AB |
| Transmitted Y (monolithic on ⅛" glass) | 44.7 | 42.9 | 45.37 |
| a*t (transmissive): (monolithic on ⅛" glass) | −5.1 | −.51 | 5.3 |
| b*t (transmissive): (monolithic on ⅛" glass) | −4.3 | 1.59 | −4.3 |
| RtY (outside reflectance): (monolithic on ⅛" glass) | 11.5 | 11.4 | 11.9 |
| a*g (outside reflective): (monolithic on ⅛" glass) | −1.7 | −4.8 | −2.7 |
| b*g (outside reflective): (monolithic on ⅛" glass) | −4.2 | −6.7 | −4.6 |
| SHGC: (in IGU) | 0.23 | N/A | N/A |
| SC | 0.26 | N/A | N/A |
| $T_{ultraviolet}$ | 0.178 | N/A | N/A |
| Rs | 2.3 | 2.3 | 1.9 |
| Transmitted ΔE* (delta L*a*b*) (monolithic on ⅛" glass) |  |  | 12.1 |
| Glass side reflection ΔE* (delta L*a*b*) (monolithic on ⅛" glass) |  |  | 3.1 |

Example 7

The present Example represents a summary of the specifications of the coatings of the present invention. Optical and electrical properties of preferred non-tempered and temperable coatings in accordance with the invention would fall within the specifications set forth in the table below.

Normal Incidence Color Specification for low-g coatings

|  | Transmission | | | Glass Side R | | | Film Side R | | | | |
|---|---|---|---|---|---|---|---|---|---|---|---|
|  | TY | a* | b* | RGY | a* | b* | RFY | a* | b* | NC Rs | SHGC |
| Min | 42.0 | −6.0 | −4.5 | 10.0 | −3.0 | −3.0 | 2.0 | −18.0 | −4.0 | 2.0 | 0.22 |
| Max | 46.0 | −3.0 | −1.5 | 12.0 | −1.0 | −6.0 | 6.0 | −10.0 | 4.0 | 2.4 | 0.25 |

The following pages include further examples of low-e stacks in accordance with the present invention. Example set 1 includes a variety of stack configurations, covering a wide range of absorbing layers, as well as different dielectrics, in accordance with the invention. Layer thicknesses are given in nm. Example set 2 provides preferred stack configurations in accordance with the invention. Example set 3 provides additional preferred stack configurations in accordance with the present inventions, which are particularly suitable for tempering. The data includes optical qualities measured before tempering (BB—"before bake") and after tempering (AB—"after bake").

As used in the example sets, the designation "CPA" refers to a particular sputtering target size. All the layers in the experimental designs are sputtered from 1 meter long targets unless specified as CPA. This CPA sputtering target is 37 cm long. "em" refers to emissivity. "Rs" refers to surface resistance (i.e., sheet resistance), measured in ohms per square. While the present invention has been described with respect to specific embodiments, it is not confined to the specific details set forth, but includes various changes and modifications that may suggest themselves to those skilled in the art, all falling within the scope of the invention as defined by the following claims.

Example Set 1

|  |  | SiN | ZnAlOx | Ag | NiCrOx | Ti | SiN | ZnAlOx | Ag | NiCrOx | Ti | SiN |  |  |
|---|---|---|---|---|---|---|---|---|---|---|---|---|---|---|
| 74-61-06 | PR1 | 3 | 5 | 9.5 | 2.2 | 2.25 | 58 | 5.5 | 13 | 2.2 | 1.75 | 29 |  | PR1 |
| 74-61-07 | PR2 | 3 | 5 | 9.5 | 2.2 | 2.25 | 58 | 5.5 | 13 | 2.2 | 1.75 | 29 |  | PR2 |
|  |  | SiN | ZnAlOx | Ag | NiCrOx | Si | SiN | ZnAlOx | Ag | NiCrOx | Si | SiN |  |  |
| 74-61-10 | PR4 | 3 | 5 | 9.5 | 2.2 | 1.8 | 58 | 5.5 | 13 | 2.2 | 1.4 | 29 |  | PR4 |
|  |  | SiN | ZnAlOx | Ag | NiCrOx | Ti | SiN | ZnAlOx | Ag | NiCrOx | Ti | SiN |  |  |
| 74-63-02 | PR5 | 3 | 5 | 9.5 | 2.2 | 2.25 | 58 | 5.5 | 13 | 2.2 | 1.75 | 29 |  | PR5 |
|  |  | SiN | ZnAlOx | Ag | NiCrOx | Ti | SiN | ZnAlOx | Ag | NiCrOx | Ti | SiN |  |  |
| 74-63-03 | PR6 | 6 | 5 | 9.7 | 2.2 | 2.5 | 59 | 5.5 | 12.6 | 2.2 | 1.3 | 27 |  | PR6 |
|  |  | SiN | ZnAlOx | Ag | NiCrOx | NiCr | SiN | ZnAlOx | Ag | NiCrOx | NiCr | SiN |  |  |
| 74-63-04 | PR7 | 3 | 5 | 9.5 | 2.2 | 4.4 | 58 | 5.5 | 13 | 2.2 | 3.5 | 29 |  | PR7 |
|  |  | SiN | ZnAlOx | Ag | NiCrOx | Si | SiN | ZnAlOx | Ag | NiCrOx | Si | SiN |  |  |
| 74-63-05 | PR8 | 3 | 5 | 9.5 | 2.2 | 4.86 | 58 | 5.5 | 13 | 2.2 | 3.78 | 29 |  | PR8 |
|  |  | SiN | ZnAlOx | Ag | NiCrOx | NiCrNx | SiN | ZnAlOx | Ag | NiCrOx | NiCrNx | SiN |  |  |
| 74-63-06 | PR9 | 3 | 5 | 9.5 | 2.2 | 6.16 | 58 | 5.5 | 13 | 2.2 | 4.9 | 29 |  | PR9 |
|  |  | SiN | ZnAlOx | Ag | NiCrOx | Ti | SiN | ZnAlOx | Ag | NiCrOx | Ti | SiN |  |  |
| 74-63-07 | PR10 | 6 | 5 | 10 | 2.2 | 2.36 | 59 | 5.5 | 11.8 | 2.2 | 1.74 | 28 |  | PR10 |
|  |  | SiN | ZnAlOx | Ag | NiCrOx | Ti | SiN | ZnAlOx | Ag | NiCrOx | Ti | ZnAlOx | SiN |  |
| 74-65-05 | PR13 | 0 | 18.5 | 9.7 | 2.2 | 5.5 | 0 | 138.25 | 12.6 | 2.2 | 4.3 | 60.75 | 0 | PR13 |
|  |  | SiN | ZnAlOx | Ag | NiCrOx | Ti | SiN | ZnAlOx | Ag | NiCrOx | Ti | ZnAlOx | SiN |  |
| 74-65-06 | PR14 | 0 | 9 | 9 | 2.2 | 3.5 | 0 | 70 | 12 | 2.2 | 2.3 | 26 | 7 | PR14 |
|  |  | SiN | ZnAlOx | Ag | NiCrOx | Ti | SiN | ZnAlOx | Ag | NiCrOx | Ti | SiN |  |  |
| 74-65-07 | PR15 | 14.2 | 5 | 10.7 | 2.2 | 2.26 | 59 | 5.5 | 12.3 | 2.2 | 1.57 | 26.6 |  | PR15 |
|  |  | SiN | ZnAlOx | Ag | NiCrOx | Ti | SiN | ZnAlOx | Ag | NiCrOx | Ti | ZnAlOx | SiN |  |
| 74-67-04 | PR18 | 0 | 11.75 | 9.7 | 2.2 | 3.8 | 0 | 71.875 | 12.6 | 2.2 | 2.6 | 22.5 | 7 | PR18 |
|  |  | SiN | ZnAlOx | Ag | NiCrOx | NiCrNx | SiN | ZnAlOx | Ag | NiCrOx | NiCrNx | SiN |  |  |
| 74-69-01 | PR20 | 3 | 5 | 9.5 | 2.2 | 4.6 | 58 | 5.5 | 13 | 2.2 | 3.7 | 29 |  | PR20 |
|  |  | SiN | ZnAlOx | Ag | NiCrOx | NiCrNx | SiN | ZnAlOx | Ag | NiCrOx | NiCrNx | SiN |  |  |
| 74-69-03 | PR22 | 3 | 5 | 9.3 | 2.2 | 4.37 | 58 | 5.5 | 12.7 | 2.2 | 2.96 | 29 |  | PR22 |
|  |  | SiN | ZnAlOx | Ag | NiCrOx | Si | SiN | ZnAlOx | Ag | NiCrOx | Si | SiN |  |  |
| 74-87-05 | PR25 | 6 | 5 | 9.7 | 2.2 | 3.7 | 59 | 5.5 | 12.6 | 2.2 | 2.2 | 27 |  | PR25 |
|  |  | SiN | ZnAlOx | Ag | NiCrOx | NiCr | SiN | ZnAlOx | Ag | NiCrOx | NiCr | SiN |  |  |
| 74-87-08 | PR27 | 6 | 5 | 9.7 | 2.2 | 4.2 | 59 | 5.5 | 12.6 | 2.2 | 3 | 27 |  | PR27 |
|  |  | SiN | ZnAlOx | Ag | NiCrOx | Ti | SiN | ZnAlOx | Ag | NiCrOx | Ti | SiN |  |  |
| 74-87-09 | PR28 | 6 | 5 | 10.1 | 2.2 | 1.8 | 59 | 5.5 | 12.2 | 2.2 | 1.8 | 27 |  | PR28 |
|  |  | SiN | ZnAlOx | Ag | NiCrOx | NiCrNx | SiN | ZnAlOx | Ag | NiCrOx | NiCrNx | SiN |  |  |
| 74-87-10 | PR29 | 6 | 5 | 9.7 | 2.2 | 4.2 | 59 | 5.5 | 12.6 | 2.2 | 2.2 | 27 |  | PR29 |
|  |  | SiN | ZnAlOx | Ag | NiCrOx | NiCrNx | SiN | ZnAlOx | Ag | NiCrOx | NiCrNx | SiN |  |  |
| 74-69-01 | PR34 | 6 | 5 | 9.7 | 2.2 | 2.94 | 59 | 5.5 | 12.6 | 2.2 | 1.54 | 27 |  | PR34 |
|  |  | SiN | ZnAlOx | Ag | NiCrOx | Ti | SiN | ZnAlOx | Ag | NiCrOx | Ti | SiN |  |  |
| 74-69-02 | PR35 | 4 | 5 | 8.5 | 2.2 | 2.8 | 64 | 5.5 | 11.5 | 2.2 | 1.9 | 31.4 |  | PR35 |
|  |  | SiN | ZnAlOx | Ag | NiCrOx | Ti | SiN | ZnAlOx | Ag | NiCrOx | Ti | SiN |  |  |
| 74-69-03 | PR36 | 14 | 5 | 10.3 | 2.2 | 2.4 | 61 | 5.5 | 12.2 | 2.2 | 1.3 | 27.2 |  | PR36 |
|  |  | SiN | ZnAlOx | Ag | NiCrOx | NiCrNx | SiN | ZnAlOx | Ag | NiCrOx | NiCrNx | SiN |  |  |
| 74-69-06 | PR39 | 6 | 5 | 9.7 | 2.2 | 2.5 | 59 | 5.5 | 12.6 | 2.2 | 1.3 | 27 |  | PR39 |
|  |  | SiN | ZnAlOx | Ag | NiCrOx | Ti | SiN | ZnAlOx | Ag | NiCrOx | Ti | SiN |  |  |

-continued

| | | SiN | ZnAlOx | Ag | NiCrOx | Ti | SiN | ZnAlOx | Ag | NiCrOx | Ti | SiN | |
|---|---|---|---|---|---|---|---|---|---|---|---|---|---|
| 74-69-07 | PR40 | 6.6 | 5 | 9.7 | 2.2 | 2.4 | 64.9 | 5.5 | 12.6 | 2.2 | 1.3 | 29.7 | PR40 |
| | | SiN | ZnAlOx | Ag | NiCrOx | Ti | SiN | ZnAlOx | Ag | NiCrOx | Ti | SiN | |
| 74-69-08 | PR41 | 6 | 5 | 9.7 | 2.2 | 2.4 | 59 | 5.5 | 12.6 | 2.2 | 1.3 | 27 | PR41 |

| | | Y | a* | b* | RgY | Rga* | Rgb* | RfY | Rfa* | Rfb* | Brush | Haze | emmis: | Rs: |
|---|---|---|---|---|---|---|---|---|---|---|---|---|---|---|
| 74-61-06 | PR1 | 40.8 | −9.5 | −4.6 | 14.8 | 13.3 | −9.7 | 3.6 | 15.7 | −1.4 | 0.02 | 0.49 | 0.035 | 2.0 |
| 74-61-07 | PR2 | 45.3 | −5.1 | −1.8 | 13.1 | 2.4 | −7.7 | 3.7 | −16.1 | 4.5 | 0 | 0.41 | 0.046 | 2.6 |
| 74-61-10 | PR4 | 59.0 | −2.8 | 6.3 | 11.3 | 1.1 | −11.7 | 4.8 | −15.2 | 13.9 | 0 | 0.29 | 0.043 | 3.8 |
| 74-63-02 | PR5 | 44.5 | −5.1 | −0.9 | 13.5 | 2.6 | −9.1 | 3.9 | −17.7 | 7.7 | 0 | 0.34 | 0.043 | 2.6 |
| 74-63-03 | PR6 | 46.2 | −3.9 | −0.9 | 14.9 | −4.5 | −5.3 | 4.6 | −17.4 | 4.5 | 0 | 0.29 | 0.044 | 2.7 |
| 74-63-04 | PR7 | 42.4 | −6.2 | −2.9 | 13.8 | 4.6 | −8.0 | 3.7 | −15.0 | 3.3 | 0 | 0.27 | 0.044 | 2.6 |
| 74-63-05 | PR8 | 35.0 | 3.1 | 20.9 | 15.7 | 6.6 | −31.4 | 2.7 | 14.7 | −14.7 | 0 | 0.26 | 0.043 | 2.6 |
| 74-63-06 | PR9 | 19.8 | −7.2 | −11.9 | 22.1 | 9.4 | −8.9 | 4.5 | 6.4 | 4.6 | | 0.78 | 0.045 | 2.6 |
| 74-63-07 | PR10 | 45.0 | −3.9 | −1.9 | 15.0 | −0.5 | −2.9 | 5.1 | −23.3 | 7.4 | 0 | 0.33 | 0.047 | 2.7 |
| 74-65-05 | PR13 | 22.6 | 9.5 | 8.3 | 50.6 | −9.6 | 46.7 | 26.0 | −13.8 | −12.5 | 0 | 1.68 | 0.046 | 3.4 |
| 74-65-06 | PR14 | 53.7 | −4.8 | −2.8 | 11.3 | 4.8 | −5.8 | 2.7 | −7.3 | 1.2 | 0 | 0.37 | 0.042 | 3.4 |
| 74-65-07 | PR15 | 46.1 | −4.6 | −4.2 | 11.8 | −1.5 | −0.2 | 4.3 | −11.1 | −2.0 | 0 | 0.38 | 0.045 | 4.6 |
| 74-67-04 | PR18 | 50.1 | −4.4 | −3.3 | 13.2 | 0.5 | −6.0 | 3.3 | 15.5 | 1.5 | | 0.45 | 0.042 | 2.6 |
| 74-69-01 | PR20 | 39.6 | −5.9 | −4.4 | 13.7 | 5.5 | −7.8 | 3.5 | −9.0 | 1.0 | | 0.74 | 0.045 | 2.5 |
| 74-69-03 | PR22 | 42.7 | −5.3 | −3.7 | 14.2 | 2.6 | −4.9 | 3.4 | −12.5 | 0.5 | | 0.47 | 0.045 | 2.5 |
| 74-87-05 | PR25 | 42.7 | 0.3 | 14.0 | 15.1 | 0.4 | −17.8 | 3.9 | 6.3 | 10.0 | 0 | 0.57 | 0.044 | 2.5 |
| 74-87-08 | PR27 | 45.2 | −5.1 | −3.0 | 13.6 | −0.5 | −6.4 | 4.8 | −17.6 | 1.1 | 0 | 0.41 | 0.044 | 2.5 |
| 74-87-09 | PR28 | 46.6 | −4.3 | −2.4 | 12.9 | 0.8 | −5.8 | 5.9 | −23.4 | 5.6 | 0 | 0.4 | 0.046 | 2.7 |
| 74-87-10 | PR29 | 34.4 | −6.0 | −6.2 | 18.6 | 0.6 | −4.3 | 3.8 | −7.0 | −4.7 | 0 | 0.53 | 0.046 | 2.5 |
| 74-69-01 | PR34 | 42.5 | −5.1 | −3.5 | 15.5 | −1.6 | −3.9 | 4.1 | −13.1 | −2.7 | 0 | 0.63 | 0.045 | 2.9 |
| 74-69-02 | PR35 | 42.5 | −3.8 | −1.0 | 14.8 | 4.0 | −12.5 | 4.0 | −15.1 | 16.5 | 0 | 0.41 | 0.052 | 3.1 |
| 74-69-03 | PR36 | 47.2 | −3.7 | −3.1 | 12.6 | −4.0 | −0.8 | 4.1 | −14.0 | 2.5 | 0 | 0.33 | 0.045 | 2.5 |
| 74-69-06 | PR39 | 46.1 | −4.8 | −3.5 | 14.3 | −2.4 | −2.8 | 4.1 | −11.0 | −5.4 | 0 | 0.46 | 0.043 | 3.0 |
| 74-69-07 | PR40 | 45.1 | −5.6 | −6.0 | 11.6 | 0.9 | −2.2 | 3.3 | 15.6 | −6.0 | | 0.25 | 0.047 | 2.6 |
| 74-69-08 | PR41 | 44.4 | −5.9 | −6.1 | 11.5 | 1.7 | −2.8 | 3.6 | 19.6 | −6.0 | 0 | 0.32 | 0.046 | 2.6 |

All thickness in nm
All optical values for ⅛" monolithic glass and using illuminant D65 10 degree Example Set 2

| | | SiN1 | ZnAlOx | Ag1 | NiCrOx | Ti1 | SiN2 | ZnAlOx | Ag2 | NiCrOx | Ti2 | SiN3 | Ag1/Ag2 | Y | a* | b* |
|---|---|---|---|---|---|---|---|---|---|---|---|---|---|---|---|---|
| 74-117-07 | ST14 | 14.5 | 5.5 | 9.8 | 2.5 | 2.7 | 66.0 | 5.5 | 11.5 | 2.5 | 1.7 | 24.8 | 84.8 | 43.8 | −3.2 | −3.3 |
| 74-117-08 | ST15 | 11.8 | 5.5 | 9.4 | 2.5 | 2.6 | 61.7 | 5.5 | 10.7 | 2.5 | 2.6 | 23.6 | 87.9 | 39.2 | −3.7 | −4.4 |
| 74-117-09 | ST16 | 9.5 | 5.5 | 9.9 | 2.5 | 3.0 | 65.4 | 5.5 | 11.0 | 2.5 | 1.7 | 26.7 | 90.2 | 42.0 | −2.8 | −3.2 |
| 74-119-01 | ST17 | 9.9 | 5.5 | 10.0 | 2.5 | 3.2 | 59.8 | 5.5 | 12.1 | 2.5 | 1.4 | 26.1 | 83.3 | 41.2 | −4.1 | −4.0 |
| 74-119-02 | ST18 | 10.4 | 5.5 | 11.2 | 2.5 | 2.9 | 64.2 | 5.5 | 13.6 | 2.5 | 2.1 | 28.5 | 81.8 | 38.5 | −5.6 | −4.3 |
| 74-119-03 | ST19 | 12.0 | 5.5 | 10.3 | 2.5 | 2.6 | 62.0 | 5.5 | 12.0 | 2.5 | 1.6 | 27.0 | 85.9 | 44.4 | −3.9 | −4.1 |
| 74-119-04 | ST20 | 14.1 | 5.5 | 9.2 | 2.5 | 2.9 | 62.3 | 5.5 | 10.6 | 2.5 | 1.4 | 30.4 | 87.2 | 46.3 | −2.7 | −3.6 |
| 74-119-05 | ST21 | 12.2 | 5.5 | 11.2 | 2.5 | 2.5 | 61.1 | 5.5 | 12.5 | 2.5 | 1.3 | 23.0 | 89.5 | 44.4 | −4.4 | −3.5 |
| 74-119-06 | ST22 | 9.0 | 5.5 | 10.4 | 2.5 | 2.0 | 60.5 | 5.5 | 12.1 | 2.5 | 1.2 | 31.0 | 85.6 | 50.2 | −4.2 | −3.5 |
| 74-119-07 | ST23 | 12.7 | 5.5 | 11.4 | 2.5 | 2.1 | 64.8 | 5.5 | 12.6 | 2.5 | 1.6 | 27.9 | 91.0 | 47.4 | −4.3 | −3.7 |
| 74-119-08 | ST24 | 10.8 | 5.5 | 10.5 | 2.5 | 1.9 | 62.9 | 5.5 | 12.7 | 2.5 | 1.6 | 24.2 | 82.5 | 47.6 | −4.1 | −2.7 |
| 74-119-09 | ST25 | 12.0 | 5.5 | 10.3 | 2.5 | 2.6 | 62.0 | 5.5 | 12.0 | 2.5 | 1.6 | 27.0 | 85.9 | 43.7 | −4.2 | −4.8 |
| 74-119-10 | ST26 | 15.0 | 5.5 | 9.7 | 2.5 | 2.7 | 58.6 | 5.5 | 12.0 | 2.5 | 1.4 | 25.5 | 81.0 | 44.9 | −4.8 | −4.4 |
| 74-119-11 | ST27 | 13.6 | 5.5 | 11.2 | 2.5 | 2.7 | 63.5 | 5.5 | 13.3 | 2.5 | 1.3 | 29.8 | 84.1 | 45.5 | −4.9 | −3.6 |
| 74-119-12 | ST28 | 11.3 | 5.5 | 10.8 | 2.5 | 2.9 | 59.2 | 5.5 | 12.1 | 2.5 | 2.0 | 29.2 | 88.7 | 39.7 | −4.7 | −5.1 |
| 74-119-13 | ST29 | 13.2 | 5.5 | 9.5 | 2.5 | 1.8 | 58.0 | 5.5 | 11.0 | 2.5 | 1.6 | 27.3 | 86.4 | 50.4 | −3.8 | −3.1 |
| 74-119-14 | ST30 | 12.0 | 5.5 | 10.3 | 2.5 | 2.6 | 62.0 | 5.5 | 12.0 | 2.5 | 1.6 | 27.0 | 85.9 | 44.5 | −4.1 | −3.5 |
| 74-119-17 | ST33 | 12.6 | 5.5 | 10.9 | 2.5 | 2.6 | 63.9 | 5.5 | 12.3 | 2.5 | 1.6 | 28.1 | 88.4 | 44.2 | −4.1 | −3.3 |
| 74-121-01 | ST34 | 13.6 | 5.5 | 10.5 | 2.5 | 2.8 | 62.4 | 5.5 | 12.2 | 2.5 | 1.4 | 28.6 | 86.4 | 44.6 | −4.2 | −3.7 |
| 74-121-02 | ST35 | 11.6 | 5.5 | 11.0 | 2.5 | 2.2 | 60.7 | 5.5 | 12.7 | 2.5 | 1.6 | 25.4 | 86.6 | 44.9 | −5.5 | −4.6 |
| 74-121-03 | ST36 | 12.3 | 5.5 | 10.5 | 2.5 | 2.5 | 60.9 | 5.5 | 12.1 | 2.5 | 1.4 | 25.8 | 86.8 | 45.4 | −4.3 | −3.8 |

| | | RgY | Rga* | Rgb* | RfY | Rfa* | Rfb* | Brush: | Haze: | emmis: | Rs | SHGC$_c$ | Rfsol-IGU | Abs1-IGU |
|---|---|---|---|---|---|---|---|---|---|---|---|---|---|---|
| 74-117-07 | ST14 | 14.5 | −6.8 | −4.3 | 7.4 | −15.1 | 4.5 | | 0.43 | 0.047 | 2.7 | 0.23 | 0.336 | 0.457 |
| 74-117-08 | ST15 | 12.6 | −2.1 | −5.9 | 8.6 | −13.7 | 0.4 | | 0.96 | 0.056 | 2.5 | 0.21 | 0.337 | 0.477 |
| 74-117-09 | ST16 | 17.7 | −4.1 | −2.6 | 6.5 | −20.7 | 6.0 | | 0.61 | 0.051 | 2.7 | 0.23 | 0.353 | 0.444 |
| 74-119-01 | ST17 | 15.9 | −4.5 | −2.7 | 3.8 | −7.1 | −3.7 | 0 | 0.41 | 0.048 | 2.6 | 0.21 | 0.357 | 0.455 |
| 74-119-02 | ST18 | 15.2 | 2.4 | −14.4 | 4.5 | −12.9 | 4.8 | 0 | 0.43 | 0.040 | 3.0 | 0.19 | 0.386 | 0.448 |
| 74-119-03 | ST19 | 13.7 | −2.3 | −3.8 | 4.8 | −16.5 | 2.1 | 0 | 0.49 | 0.045 | 4.0 | 0.23 | 0.355 | 0.444 |
| 74-119-04 | ST20 | 13.1 | 0.9 | 2.3 | 3.5 | −15.9 | 5.0 | 0 | 0.44 | 0.054 | 2.9 | 0.26 | 0.319 | 0.452 |

-continued

| | | | | | | | | | | | | | |
|---|---|---|---|---|---|---|---|---|---|---|---|---|---|
| 74-119-05 | ST21 | 15.3 | −7.3 | −6.0 | 6.2 | −9.8 | −8.0 | 0 | 0.59 | 0.042 | 2.3 | 0.22 | 0.382 | 0.424 |
| 74-119-06 | ST22 | 13.0 | 2.9 | −0.8 | 3.4 | −18.8 | 5.9 | 0 | 0.51 | 0.041 | 2.4 | 0.25 | 0.374 | 0.398 |
| 74-119-07 | ST23 | 13.6 | −0.7 | −6.0 | 5.6 | −22.4 | 2.4 | 0 | 0.54 | 0.041 | 2.2 | 0.23 | 0.375 | 0.416 |
| 74-119-08 | ST24 | 12.8 | −5.7 | −10.7 | 7.8 | −17.4 | 0.1 | 0 | 0.38 | 0.042 | 2.2 | 0.24 | 0.371 | 0.416 |
| 74-119-09 | ST25 | 13.4 | −1.8 | −2.7 | 4.3 | −11.7 | −2.9 | | 0.39 | 0.046 | 2.9 | 0.23 | 0.361 | 0.436 |
| 74-119-10 | ST26 | 11.3 | −3.8 | −1.0 | 3.9 | 1.7 | −3.8 | 0 | 0.45 | 0.045 | 2.8 | 0.23 | 0.346 | 0.447 |
| 74-119-11 | ST27 | 13.9 | 0.0 | −4.7 | 3.0 | −10.1 | 2.7 | 0 | 0.43 | 0.042 | 2.2 | 0.22 | 0.382 | 0.42 |
| 74-119-12 | ST28 | 14.3 | 2.9 | 1.1 | 3.0 | −11.9 | −1.5 | 0 | 0.62 | 0.043 | 2.3 | 0.2 | 0.376 | 0.446 |
| 74-119-13 | ST29 | 10.1 | −0.7 | 3.2 | 4.6 | −16.5 | 0.6 | 0 | 0.32 | 0.048 | 2.8 | 0.26 | 0.352 | 0.41 |
| 74-119-14 | ST30 | 13.6 | −2.7 | −3.1 | 4.7 | −15.9 | 1.2 | | 0.55 | 0.043 | 2.3 | 0.23 | 0.361 | 0.435 |
| 74-119-17 | ST33 | 15.1 | −4.3 | −4.7 | 5.6 | −17.4 | 0.4 | 0 | 0.37 | 0.043 | 2.7 | 0.22 | 0.376 | 0.427 |
| 74-121-01 | ST34 | 14.4 | −5.0 | −1.7 | 4.3 | −11.0 | −2.3 | 0 | 0.39 | 0.042 | 2.1 | 0.23 | 0.368 | 0.432 |
| 74-121-02 | ST35 | 13.0 | −0.2 | −4.7 | 5.1 | −6.7 | −7.4 | 0 | 0.53 | 0.040 | 2.4 | 0.22 | 0.394 | 0.411 |
| 74-121-03 | ST36 | 13.6 | −4.0 | −2.1 | 4.6 | −9.9 | −4.8 | 0 | 0.53 | 0.041 | 2.5 | 0.23 | 0.373 | 0.423 |

All thickness in nm
All optical values for ⅛" monolithic glass and using illuminant D65 10 degree except SHGC, Rfsol and Abs1 which is computed using LBL Window
5 for a ⅛"-½-⅛" IGU - Coating in position2

EXAMPLE SET 3

| | A | B | C | D | E | F | G | H | I | J | K | L | M | N | O |
|---|---|---|---|---|---|---|---|---|---|---|---|---|---|---|---|
| 1 | | | | | | | | | | | | | | | |
| 2 | | | | | | | | | | | | | | | |
| 3 | | | | | | | | | | | | | | | |
| 4 | ID # | Run # | Barrier | SiN1 | ZnAlOx1 | Ag1 | NiCrOx1 | Ti | SiN | ZnAlOx | Ag | NiCrOx | Ti | SiN | b*max |
| 5 | CD06 | 1 | Ti | 13 | 5.5 | 11.1 | 2.5 | 2.4 | 59 | 5.5 | 12.6 | 2.5 | 1.3 | 27 | 7.15 |
| 6 | | | | SiN | ZnAlOx | Ag | NiCrOx | Cr-CPA | SiN | ZnAlOx | Ag | NiCrOx | Cr-CPA | SiN | b*max |
| 7 | CD07 | 2 | Cr | 13 | 5.5 | 11.1 | 2.5 | 2 | 59 | 5.5 | 12.6 | 2.5 | 1.3 | 27 | 7.15 |
| 8 | | | | SiN | ZnAlOx | Ag | NiCrOx | Ti | SiN | ZnAlOx | Ag | NiCrOx | Ti | SiN | b*max |
| 9 | CD08 | 3 | Ti | 13 | 5.5 | 11.1 | 2.5 | 2 | 67 | 5.5 | 12.6 | 2.5 | 2 | 38 | 7.15 |
| 10 | | | | SiN | ZnAlOx | Ag | NiCrOx | Cr-CPA | SiN | ZnAlOx | Ag | NiCrOx | Cr-CPA | SiN | b*max |
| 11 | CD09 | 4 | Cr | 13 | 5.5 | 11.1 | 2.5 | 1.5 | 67 | 5.5 | 12.6 | 2.5 | 1.5 | 38 | 7.15 |
| 12 | | | | SiN | ZnAlOx | Ag | NiCrOx | Cr-CPA | SiN | ZnAlOx | Ag | NiCrOx | Cr-CPA | SiN | b*max |
| 13 | CD10 | 5 | Cr | 13.0 | 5.5 | 11.1 | 2.5 | 1.5 | 59.0 | 5.5 | 12.6 | 2.5 | 1.5 | 27.0 | 7.2 |
| 14 | | | | SiN | ZnAlOx | Ag | NiCrOx | Cr-CPA | SiN | ZnAlOx | Ag | NiCrOx | Cr-CPA | SiN | b*max |
| 15 | CD11 | 6 | Cr | 13 | 5.5 | 11.1 | 2.5 | 1.5 | 59 | 5.5 | 12.6 | 2.5 | 1.5 | 27 | 6.05 |
| 16 | | | | SiN | ZnAlOx | Ag | NiCrOx | Ti | SiN | ZnAlOx | Ag | NiCrOx | Ti | SiN | b*max |
| 17 | CD12 | 7 | Ti | 13 | 5.5 | 11.1 | 2.5 | 3.08 | 59.3 | 5.5 | 12.6 | 2.5 | 1.42 | 25.1 | 6.05 |
| 18 | | | | SiN | ZnAlOx | Ag | NiCrOx | Cr-CPA | SiN | ZnAlOx | Ag | NiCrOx | Cr-CPA | SiN | b*max |
| 19 | CD13 | 8 | Cr | 13 | 5.5 | 11.1 | 2.5 | 2.5 | 61.9 | 5.5 | 12.6 | 2.5 | 1.99 | 23 | 6.05 |
| 20 | | | | SiN | ZnAlOx | Ag | NiCrOx | Ti | SiN | ZnAlOx | Ag | NiCrOx | Ti | SiN | b*max |
| 21 | CD14 | 9 | Ti | 13 | 5.5 | 11.1 | 2.5 | 2.84 | 58 | 5.5 | 12.6 | 2.5 | 1.66 | 33.7 | 6 |
| 22 | | | | SiN | ZnAlOx | Ag | NiCrOx | Cr-CPA | SiN | ZnAlOx | Ag | NiCrOx | Cr-CPA | SiN | b*max |
| 23 | CD15 | 10 | Cr | 13 | 5.5 | 11.1 | 2.5 | 3.18 | 64.4 | 5.5 | 12.6 | 2.5 | 1.32 | 29.4 | 6 |
| 24 | | | | SiN | ZnAlOx | Ag | NiCrOx | Ti | SiN | ZnAlOx | Ag | NiCrOx | Ti | SiN | b*max |
| 25 | CD16 | 11 | Ti | 13 | 5.5 | 11.1 | 2.5 | 2.28 | 65.7 | 5.5 | 12.6 | 2.5 | 2.22 | 35.9 | 6 |
| 26 | | | | SiN | ZnAlOx | Ag | NiCrOx | Cr-CPA | SiN | ZnAlOx | Ag | NiCrOx | Cr-CPA | SiN | b*max |
| 27 | CD17 | 12 | Cr | 13 | 5.5 | 11.1 | 2.5 | 2.69 | 67 | 5.5 | 12.6 | 2.5 | 1.8 | 27.3 | 6 |
| 28 | | | | SiN | ZnAlOx | Ag | NiCrOx | Ti | SiN | ZnAlOx | Ag | NiCrOx | Ti | SiN | b*max |
| 29 | CD18 | 13 | Ti | 13 | 5.5 | 11.1 | 2.5 | 2 | 60.6 | 5.5 | 12.6 | 2.5 | 2.5 | 31.6 | 6 |
| 30 | | | | SiN | ZnAlOx | Ag | NiCrOx | Cr-CPA | SiN | ZnAlOx | Ag | NiCrOx | Cr-CPA | SiN | b*max |
| 31 | CD19 | 14 | Cr | 13 | 5.5 | 11.1 | 2.5 | 2.97 | 63.1 | 5.5 | 12.6 | 2.5 | 1.53 | 38 | 6 |
| 32 | | | | SiN | ZnAlOx | Ag | NiCrOx | Ti | SiN | ZnAlOx | Ag | NiCrOx | Ti | SiN | b*max |
| 33 | CD20 | 15 | Ti | 13 | 5.5 | 11.1 | 2.5 | 2.97 | 63.1 | 5.5 | 12.6 | 2.5 | 1.53 | 38 | 6 |
| 34 | | | | SiN | ZnAlOx | Ag | NiCrOx | Cr-CPA | SiN | ZnAlOx | Ag | NiCrOx | Cr-CPA | SiN | b*max |
| 35 | CD21 | 16 | Cr | 13 | 5.5 | 11.1 | 2.5 | 2 | 60.6 | 5.5 | 12.6 | 2.5 | 2.5 | 31.57 | 6 |
| 36 | | | | SiN | ZnAlOx | Ag | NiCrOx | Ti | SiN | ZnAlOx | Ag | NiCrOx | Ti | SiN | b*max |
| 37 | CD22 | 17 | Ti | 13 | 5.5 | 11.1 | 2.5 | 2.69 | 67 | 5.5 | 12.6 | 2.5 | 1.81 | 27.3 | 5.95 |
| 38 | | | | SiN | ZnAlOx | Ag | NiCrOx | Cr-CPA | SiN | ZnAlOx | Ag | NiCrOx | Cr-CPA | SiN | b*max |
| 39 | CD23 | 18 | Cr | 13 | 5.5 | 11.1 | 2.5 | 2.28 | 65.7 | 5.5 | 12.6 | 2.5 | 2.22 | 35.9 | 5.95 |
| 40 | | | | SiN | ZnAlOx | Ag | NiCrOx | Ti | SiN | ZnAlOx | Ag | NiCrOx | Ti | SiN | b*max |
| 41 | CD24 | 19 | Ti | 13 | 5.5 | 11.1 | 2.5 | 3.18 | 64.4 | 5.5 | 12.6 | 2.5 | 1.32 | 29.4 | 5.95 |
| 42 | | | | SiN | ZnAlOx | Ag | NiCrOx | Cr-CPA | SiN | ZnAlOx | Ag | NiCrOx | Cr-CPA | SiN | b*max |
| 43 | CD25 | 20 | Cr | 13 | 5.5 | 11.1 | 2.5 | 2.84 | 58 | 5.5 | 12.6 | 2.5 | 1.66 | 33.7 | 5.95 |
| 44 | | | | SiN | ZnAlOx | Ag | NiCrOx | NiCr-Me | SiN | ZnAlOx | Ag | NiCrOx | NiCr-Me | SiN | b*max |
| 45 | CD26 | 21 | NiCr | 13 | 5.5 | 11.1 | 2.5 | 4.5 | 67 | 5.5 | 12.6 | 2.5 | 2.5 | 27.3 | 5.95 |
| 46 | | | | SiN | ZnAlOx | Ag | NiCrOx | Cr-CPA | SiN | ZnAlOx | Ag | NiCrOx | Cr-CPA | SiN | b*max |
| 47 | CD27 | 22 | Cr rep of 17 | 13 | 5.5 | 11.1 | 2.5 | 2.69 | 67 | 5.5 | 12.6 | 2.5 | 1.8 | 27.3 | 5.95 |
| 48 | | | | SiN | ZnAlOx | Ag | NiCrOx | Cr-CPA | SiN | ZnAlOx | Ag | NiCrOx | NiCr-Me | SiN | b*max |
| 49 | CD28 | 23 | Cr/NiCr | 13 | 5.5 | 11.1 | 2.5 | 2.69 | 67 | 5.5 | 12.6 | 2.5 | 2.5 | 27.3 | 5.95 |
| 50 | | | | SiN | ZnAlOx | Ag | NiCrOx | Ti | SiN | ZnAlOx | Ag | NiCrOx | Ti | SiN | b*max |
| 51 | CD29 | 24 | Ti | 13 | 5.5 | 11.1 | 2.5 | 2.5 | 61.9 | 5.5 | 12.6 | 2.5 | 1.99 | 23 | 5.95 |
| 52 | | | | SiN | ZnAlOx | Ag | NiCrOx | Cr-CPA | SiN | ZnAlOx | Ag | NiCrOx | Cr-CPA | SiN | b*max |

EXAMPLE SET 3-continued

| | | | | | | | | | | | | | | | |
|---|---|---|---|---|---|---|---|---|---|---|---|---|---|---|---|
| 53 | CD30 | 25 | Cr | 13 | 5.5 | 11.1 | 2.5 | 3.08 | 59.3 | 5.5 | 12.6 | 2.5 | 1.42 | 25.1 | 5.95 |
| 54 | | | | | | | | | | | | | | | |
| 55 | | 26 | | | | | | | | | | | | | |

| | P | Q | R | S | T | U | V | W | X | Y | Z | AA | AB |
|---|---|---|---|---|---|---|---|---|---|---|---|---|---|
| 1 | | | | | | | | | | | | | |
| 2 | | | | | | | | | | | | | |
| 3 | | | | | | | | | | | | | |
| 4 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 5 | 88.1 | 45.67 | −4.03 | 0.89 | 13.53 | −4.97 | 3.08 | 4.36 | −14.78 | 0.04 | 1 | 0.58 | 0.018 |
| 6 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 7 | 88.1 | 39.18 | −4.39 | −1.51 | 14.06 | −2.28 | 2.23 | 4.24 | −7.18 | −3.96 | 0 | 0.6 | 0.018 |
| 8 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 9 | 88.1 | 46.72 | −6.19 | 4.4 | 10.89 | 16.51 | −15.37 | 3.35 | −2.27 | 2.99 | 0 | 0.44 | 0.019 |
| 10 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 11 | 88.1 | 45.29 | −5.78 | 2.21 | 11.01 | 15.11 | −6.93 | 3.1 | −9.13 | 5.33 | 0 | 0.45 | 0.018 |
| 12 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 13 | 88.1 | 42.02 | −4.65 | −0.92 | 11.56 | 0.76 | −0.01 | 5.65 | −14 | 1.67 | 0 | 0.46 | 0.02 |
| 14 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 15 | 88.1 | 42.58 | −4.71 | −3.82 | 11.19 | 2.31 | 0.42 | 5.13 | −11.12 | −2.96 | 0 | 0.43 | 0.021 |
| 16 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 17 | 88.1 | 41.66 | −4.36 | −2.54 | 14.71 | −5.47 | −0.36 | 4.29 | −2.46 | −6.89 | 0 | 0.56 | 0.017 |
| 18 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 19 | 88.1 | 32.43 | −4.79 | −6.02 | 14.38 | −0.36 | −7 | 8.04 | −2.01 | −7.58 | 0 | 0.54 | 0.018 |
| 20 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 21 | 88.1 | 41.78 | −4.57 | −2.84 | 14.03 | 4.2 | 10.94 | 2.3 | −12.5 | −2.55 | 5 | 0.5 | 0.018 |
| 22 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 23 | 88.1 | 32.05 | −2.64 | −5.24 | 19.71 | −4.59 | 2.73 | 2.97 | −2.06 | −9.98 | 0 | 0.63 | 0.016 |
| 24 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 25 | 88.1 | 43.81 | −5.28 | −2.25 | 11.47 | 11.69 | −6.6 | 3.28 | −16.66 | 11.94 | 1 | 0.29 | 0.019 |
| 26 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 27 | 88.1 | 34.99 | −4.11 | −4.16 | 16.96 | −3.03 | −3.69 | 5.9 | −13.45 | −1.21 | 1 | 0.58 | 0.019 |
| 28 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 29 | 88.1 | 41.85 | −5.02 | −4.35 | 10.95 | 8.42 | 4.28 | 3.82 | −17.2 | 3.51 | 1 | 0.44 | 0.019 |
| 30 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 31 | 88.1 | 31.65 | −1.79 | −7.84 | 16.98 | 4.03 | 4.94 | 1.81 | −14.38 | −5.18 | 0 | 0.6 | 0.019 |
| 32 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 33 | 88.1 | 42.31 | −4.23 | −2.8 | 13.73 | 7.9 | 4.56 | 2.36 | −10.7 | −1.01 | 0 | 0.57 | 0.019 |
| 34 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 35 | 88.1 | 31.37 | −4.17 | −9.46 | 12 | 11.38 | 4.47 | 4.17 | −7.5 | 0.94 | 1 | 0.5 | 0.019 |
| 36 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 37 | 88.1 | 42.48 | −3.71 | −1.75 | 15.08 | −4.56 | −4.18 | 6.72 | −18.9 | 6.97 | 3 | 0.57 | 0.019 |
| 38 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 39 | 88.1 | 35.16 | −5.3 | −5.65 | 12.74 | 12.48 | 8.99 | 2.86 | −16.56 | 11.61 | 1 | 0.49 | 0.021 |
| 40 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 41 | 88.1 | 42.66 | −3.73 | −1.95 | 15.82 | −3.98 | 1.17 | 3.52 | −15.01 | 1.21 | 1 | 0.44 | 0.019 |
| 42 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 43 | 88.1 | 30.75 | −2.61 | −8.28 | 16.72 | 1.54 | 11.68 | 1.57 | 4.01 | −13.15 | 1 | 0.52 | 0.02 |
| 44 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 45 | 88.1 | 38.84 | −3.85 | −3.76 | 22.23 | −6.6 | 4.29 | 4.31 | −16.36 | −10.77 | 0.02 | 0.88 | 0.017 |
| 46 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 47 | 88.1 | 31.5 | −3.22 | −6.76 | 17.2 | −3.26 | −4.48 | 5.85 | −5.24 | −6.29 | 0.01 | 0.32 | 0.018 |
| 48 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 49 | 88.1 | 32.01 | −4.21 | −7.34 | 16.74 | −4.03 | −5.74 | 5.51 | 1.16 | −5.41 | 0.02 | 0.48 | 0.021 |
| 50 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 51 | 88.1 | 41.29 | −4.9 | −3.82 | 12.28 | −2.33 | −6.08 | 6.91 | −5.15 | −8.46 | 0 | 0.41 | 0.019 |
| 52 | Ag1/Ag2 | BB Y | BB a* | BB b* | BB Rg Y | BB Rg a* | BB Rg b* | BB Rf Y | BB Rf a* | BB Rf b* | BB Brush | BB Haze | BB em |
| 53 | 88.1 | 31.1 | −3.69 | −6.53 | 18.26 | −4.43 | 0.5 | 3.93 | 14.91 | −12.73 | 0 | 0.71 | 0.018 |
| 54 | | | | | | | | | | | | | |
| 55 | | | | | | | | | | | | | |

| | AC | AD | AE | AF | AG | AH | AI | AJ | AK | AL | AM | AN | AO | AP |
|---|---|---|---|---|---|---|---|---|---|---|---|---|---|---|
| 1 | | | | | | | | | | | | | | |
| 2 | | | | | | | | | | | | | | |
| 3 | | | | | | | | | | | | | | |
| 4 | BB Rs | AB Y | AB a* | AB b* | AB Rg Y | AB RG a* | AB RG b* | AB Rf Y | AB Rf a* | AB Rf b* | AB Brush | AB Haze | AB em | AB Rs |
| 5 | 3.3 | 48.7 | −8.3 | −4.37 | 13.84 | −1.05 | −0.01 | 4.28 | 9.43 | −10.47 | 95 | 0.7 | 0.017 | 2.9 |
| 6 | BB Rs | AB Y | AB a* | AB b* | AB Rg Y | AB RG a* | AB RG b* | AB Rf Y | AB Rf a* | AB Rf b* | AB Brush | AB Haze | AB em | AB Rs |
| 7 | 2.04 | 50.73 | −6.03 | −1.73 | 12.93 | −0.01 | 2.69 | 4.83 | −5.32 | −9.12 | 0 | 0.69 | 0.022 | 3.01 |
| 8 | BB Rs | AB Y | AB a* | AB b* | AB Rg Y | AB RG a* | AB RG b* | AB Rf Y | AB Rf a* | AB Rf b* | AB Brush | AB Haze | AB em | AB Rs |
| 9 | 3.14 | 51.07 | −9.08 | −2.05 | 12 | 14.93 | −6.8 | 3.45 | −10.65 | −1.44 | 5 | 0.48 | 0.028 | 2.94 |
| 10 | BB Rs | AB Y | AB a* | AB b* | AB Rg Y | AB RG a* | AB RG b* | AB Rf Y | AB Rf a* | AB Rf b* | AB Brush | AB Haze | AB em | AB Rs |
| 11 | 2.55 | 55.62 | −6.99 | −0.29 | 11.62 | 12.74 | 1.59 | 3.84 | −9.61 | 5.32 | 0 | 0.47 | 0.024 | 2.68 |

EXAMPLE SET 3-continued

| | BB Rs | AB Y | AB a* | AB b* | AB Rg Y | AB RG a* | AB RG b* | AB Rf Y | AB Rf a* | AB Rf b* | AB Brush | AB Haze | AB em | AB Rs |
|---|---|---|---|---|---|---|---|---|---|---|---|---|---|---|
| 12 | | | | | | | | | | | | | | |
| 13 | 2.12 | 53.06 | −7.07 | −2.09 | 11.38 | 2.59 | 0.72 | 5.25 | −5.05 | −7.69 | 0 | 0.49 | 0.025 | 3.02 |
| 15 | 2.59 | 50.31 | −5.8 | −3.53 | 11.3 | 3.41 | 2.1 | 5.04 | −4.05 | −9.25 | 0 | 0.87 | 0.025 | 3.14 |
| 17 | 2.65 | 44.1 | −8.61 | −6.31 | 14.75 | 0.2 | −3.97 | 4.57 | 21.16 | −11 | 99 | 0.62 | 0.016 | 2.96 |
| 19 | 2.65 | 44.84 | −7.79 | −4.32 | 13.5 | 2.15 | −6.89 | 7.87 | 2.25 | −14.01 | 1 | 1.87 | 0.033 | 3.58 |
| 21 | 2.68 | 43.92 | −7.21 | −8.68 | 15.82 | 4.46 | 14.97 | 3.1 | 7.8 | 1.91 | 60 | 0.56 | 0.02 | 3.12 |
| 23 | 2.31 | 44.55 | −5.83 | −4.22 | 16.86 | −2.51 | 1.97 | 3.78 | −6.72 | −6.57 | 5 | 0.54 | 0.017 | 3.01 |
| 25 | 2.51 | 45.56 | −8.01 | −7.53 | 12.78 | 10.91 | 1.61 | 2.99 | −14.88 | 0.61 | 1 | 0.42 | 0.032 | 3.54 |
| 27 | 2.5 | 44.15 | −5.44 | −3.86 | 15.42 | −3.2 | −2.69 | 6.59 | −19.38 | −6.99 | 1 | 0.79 | 0.028 | 3.54 |
| 29 | 2.53 | 40.17 | −7.83 | −10.79 | 12.52 | 11.86 | 11.23 | 3.47 | 1.84 | −5.27 | 90 | 0.73 | 0.035 | 3.02 |
| 31 | 2.2 | 44.48 | −6.42 | −6.49 | 15.8 | 8.51 | 10.13 | 3.23 | −5.09 | 7.51 | 15 | 0.7 | 0.025 | 3.24 |
| 33 | 2.67 | 45.3 | −6.64 | −7.51 | 15.27 | 6.57 | 11.08 | 2.98 | 0.62 | 5.23 | 98 | 0.61 | 0.019 | 2.46 |
| 35 | 2.58 | 45.14 | −8.47 | −8.27 | 12.8 | 11.26 | 10.54 | 3.86 | 8.49 | −4.59 | 0 | 1.24 | 0.038 | 3.64 |
| 37 | 2.54 | 43.22 | −6.86 | −4.51 | 15.31 | −5.1 | −5.26 | 6.24 | −13.47 | −9.65 | 1 | 0.73 | 0.029 | 3.26 |
| 39 | 2.93 | 46.59 | −7.33 | −6.07 | 13.12 | 11.99 | −1.11 | 3.63 | −13.06 | 3.57 | 1 | 1.36 | 0.037 | 3.64 |
| 41 | 2.97 | 46.33 | −6.26 | −5.3 | 15.82 | −3.94 | −0.61 | 3.38 | 0.97 | −6.33 | 99 | 0.48 | 0.015 | 2.77 |
| 43 | 2.55 | 42.1 | −6.92 | −8.24 | 16.19 | 6.2 | 16.92 | 2.98 | 7.21 | 0.15 | 5 | 0.79 | 0.029 | 3.42 |
| 45 | 2.5 | 42.58 | −5.16 | −4.64 | 21.47 | −7.14 | −0.27 | 4.46 | −4.89 | −14.33 | 0.05 | 0.93 | 0.001 | 1.69 |
| 47 | 2.61 | 45.79 | −6.32 | −3.79 | 15.4 | −2.58 | −2.98 | 6.75 | −15.14 | −8.24 | 0.05 | 1.13 | 0.034 | 3.01 |
| 49 | 3.15 | 42.26 | −7.95 | −5.75 | 13.61 | 2.77 | −10.22 | 6.62 | −8.56 | −9.84 | 0.03 | 0.75 | 0.01 | 2.51 |
| 51 | 2.5 | 44.11 | −9.97 | −6.68 | 12.58 | 6.24 | 8.63 | 6.86 | 17.36 | −17.25 | 0 | 0.42 | 0.023 | 3.06 |
| 53 | 2.65 | 41.2 | −7.1 | −5.17 | 15.85 | 0.95 | 0.14 | 4.67 | 13.17 | −13.37 | 0 | 1.05 | 0.023 | 3.23 |
| 54 | | | | | | | | | | | | | | |
| 55 | | | | | | | | | | | | | | |

What is claimed is:

1. A low-emissivity coating on a substrate, the coating comprising, in order outward from the substrate:
   a) a first dielectric layer;
   b) a first Ag layer;
   c) a first barrier layer comprising an oxide of nickel and/or chromium, wherein the first barrier layer comprises about 15 to 60 atomic percent oxygen;
   d) a first absorbing layer comprising nickel and/or chromium;
   e) a second dielectric layer;
   f) a second Ag layer;
   g) a second absorbing layer;
   i) a third dielectric layer; and
   j) optionally, a topcoat layer, wherein the first barrier layer is in direct contact with the first Ag layer, the first absorbing layer is in direct contact with the first barrier layer and either the first absorbing layer or the second absorbing layer is optional.

2. The coating of claim 1, further comprising a second barrier layer between the second Ag layer and the second absorbing layer.

3. The low emissivity coating of claim 2, wherein the second barrier layer comprises oxide of nickel and/or chromium.

4. The low-emissivity coating of claim 1, wherein at least one of said first dielectric layer, said second dielectric layer or said third dielectric layer is in sub-stoichiometric state.

5. The low-emissivity coating of claim 4, wherein each of said first dielectric layer, said second dielectric layer or said third dielectric layer is in sub-stoichiometric state.

6. The low-emissivity coating of claim 1, further comprising a first nucleation layer between the first dielectric layer and the first Ag layer.

7. The low-emissivity coating of claim 1, further comprising a second nucleation layer between the second dielectric layer and the second Ag layer.

8. The low-emissivity coating of claim 1, wherein the second absorbing layer comprises a material selected from the group consisting of a metal, an alloy, a silicide, an oxide, and a nitride.

9. The low-emissivity coating of claim 1, wherein the second absorbing layer comprises a material selected from the group consisting of Ti, TiN, Si, NiCr, an oxide of nickel and/or chromium, Cr, Zr, Mo, W, and ZrSi.

10. The low-emissivity coating of claim 9, wherein the second absorbing layer comprises NiCr.

11. The low-emissivity coating of claim 1, wherein at least one of the first or second absorbing layers is capable of lowering transmission of the coating.

12. The low-emissivity coating of claim 11, wherein the at least one absorbing layer comprises a material that has an index of refraction at wavelength 550 nm of from about 1 to about 5.5.

13. The low-emissivity coating of claim 11, wherein the at least one absorbing layer comprises a material that has an extinction coefficient at wavelength 550 nm of from about 1.75 to about 4.5.

14. The low-emissivity coating of claim 11, wherein the at least one absorbing layer comprises a material which has an index plot having a positive slope at 550 nm when the index of refraction is plotted against wavelength.

15. The low-emissivity coating of claim 11, wherein the at least one absorbing layer comprises a material which has an index plot having a positive slope at 550 nm when the extinction coefficient is plotted against wavelength.

16. The low emissivity coating of claim 1, wherein the first absorbing layer is thicker than the second absorbing layer.

17. The low emissivity coating of claim 1, wherein the first absorbing layer has a thickness of about 0.2 nm to about 8 nm.

18. The low-emissivity coating of claim 17, wherein the first absorbing layer has a thickness of about 1 nm to about 6 nm.

19. The low-emissivity coating of claim 18, wherein the first absorbing layer has a thickness of about 1.5 nm to about 4 nm.

20. The low-emissivity coating of claim 1, wherein the second absorbing layer has a thickness of about 0.1 nm to about 8 nm.

21. The low-emissivity coating of claim 20, wherein the second absorbing layer has a thickness of about 0.1 nm to about 5 nm.

22. The low-emissivity coating of claim 21, wherein the second absorbing layer has a thickness of about 0.1 nm to about 1 nm.

23. The low-emissivity coating of claim 1, wherein the first absorbing layer has a thickness of about 3 nm.

24. The low-emissivity coating of claim 23, wherein the second absorbing layer has a thickness of about 0.5 nm.

25. The low-emissivity coating of claim 1, wherein the first absorbing layer has a thickness of about 3.6 nm.

26. The low-emissivity coating of claim 25, wherein the second absorbing layer has a thickness of about 0.1 nm.

27. The low-emissivity coating of claim 1, wherein each of the first dielectric layer, the second dielectric layer, and the third dielectric layer independently comprises a material selected from an oxide, a nitride, and an oxy-nitride, or a combination thereof.

28. The low-emissivity coating of claim 27, wherein at least one of the first dielectric layer, the second dielectric layer, and the third dielectric layer comprises an oxide.

29. The low-emissivity coating of claim 28, wherein the oxide is sputtered from a Ti, a Zn, an Sn, a ZnSn alloy, or a Bi target.

30. The low-emissivity coating of claim 28, wherein the oxide comprises $Nb_2O_5$.

31. The low-emissivity coating of claim 29, wherein the oxide comprises up to about 20 wt % of an element selected from the group consisting of Al and B.

32. The low-emissivity coating of claim 30, wherein the oxide comprises up to about 10 wt % of an element selected from the group consisting of Al and B.

33. The low-emissivity coating of claim 27, wherein at least one of the first dielectric layer, the second dielectric layer, and the third dielectric layer comprises a nitride or an oxy-nitride.

34. The low-emissivity coating of claim 33, wherein the nitride or oxy-nitride is a nitride or oxy-nitride of Si, SiAl, SiB, or SiZr.

35. The low-emissivity coating of claim 34, wherein the nitride or oxy-nitride comprises up to about 20 wt % of an element selected from the group consisting of Al and B.

36. The low-emissivity coating of claim 35, wherein the nitride or oxy-nitride comprises up to about 10 wt % of an element selected from the group consisting of Al and B.

37. The low-emissivity coating of claim 1, wherein at least one of the first dielectric layer, the second dielectric layer, or the third dielectric layer has an index of refraction that is between about 2.05 and about 2.4 at a wavelength of 550 nm.

38. The low-emissivity coating of claim 37, wherein at least one of the first dielectric layer, the second dielectric layer, or the third dielectric layer has an index of refraction that is between about 2.1 and about 2.3 at a wavelength of 550 nm.

39. The low-emissivity coating of claim 1, wherein at least one of the first dielectric layer, the second dielectric layer, or the third dielectric layer has an extinction coefficient that is between about 0 and about 0.05 at a wavelength of 550 nm.

40. The low-emissivity coating of claim 39, wherein at least one of the first dielectric layer, the second dielectric layer, or the third dielectric layer has an extinction coefficient that is between about 0.01 and about 0.02 at a wavelength of 550 nm.

41. The low-emissivity coating of claim 1, further comprising a second nucleation layer between the second dielectric layer and the second Ag layer, said second nucleation layer having a thickness of about 2 nm to about 11 nm.

42. The low emissivity coating of claim 1, wherein the substrate is glass.

43. The low-emissivity stack of claim 42, wherein the glass substrate has a thickness of about 1/8 inch.

44. The low-emissivity stack of claim 1, wherein the low-emissivity stack characterized by a solar heat gain coefficient (SHGC) that is less than about 0.30.

45. The low emissivity stack of claim 1, wherein the stack has a light transmittance of about 42% to about 46%, as measured on an IGU.

46. The low-emissivity stack of claim 1, wherein said stack has a transmittance color with a negative a* and a negative b*.

47. A method of making a low-emissivity stack having a low solar heat gain coefficient (SHGC), said method comprising depositing on a substrate the coating of claim 1.

48. The method of claim 47, wherein the depositing comprises magnetron sputtering.

49. The low-emissivity stack of claim 1, wherein the low-emissivity stack having the following characteristics:
   a transmitted Y value of about 30 to about 60;
   a negative transmitted a* value;
   an RgY of about 8 to about 20;
   a negative Rg a* value;
   an RfY of about 2 to about 12;
   a negative Rf a* value; and
   an SHGC of about 0.10 to about 0.30.

50. The low emissivity stack of claim 1, characterized by a tolerance for tempering or heat strengthening.

51. The low emissivity stack of claim 50, wherein the optical qualities of the stack are not degraded following tempering or heat strengthening.

52. The low emissivity coating of claim 1, wherein the oxide of nickel and/or chromium comprises about 20 to about 50 atomic percent of oxygen.

53. The low emissivity coating of claim 52, wherein the oxide of nickel and/or chromium comprises about 20 atomic percent of oxygen.

54. The low emissivity coating of claim 1, wherein the oxide of nickel and/or chromium comprises about 20 to about 55 atomic percent of oxygen.

55. The low emissivity coating of claim 54, wherein the oxide of nickel and/or chromium comprises about 20 atomic percent of oxygen.

56. A low-emissivity coating on a substrate, the coating comprising, in order outward from the substrate:
   a) a first dielectric layer having a thickness up to about 25 nm;
   b) a first Ag layer having a thickness of about 8 nm to about 15 nm;
   c) a first barrier layer comprising of an oxide of nickel and/or chromium, wherein the first barrier layer comprises about 15 to 60 atomic percent oxygen and having a thickness of about 0.1 nm to about 4 nm;
   d) a first absorbing layer comprising nickel and/or chromium and having a thickness of about 0.2 nm to about 8 nm;
   e) a second dielectric layer having a thickness of about 40 nm to about 75 nm;
   f) a second Ag layer having a thickness of about 8 nm to about 15 nm;
   g) a second absorbing layer having a thickness of about 0.1 nm to about 8 nm;
   h) a third dielectric layer having a thickness of about 10 nm to about 40 nm; and
   i) optionally, a topcoat layer and,
   wherein the first barrier layer is in direct contact with the first Ag layer and the first absorbing layer is in direct contact with the first barrier layer.

57. The coating of claim 56, further comprising a second barrier layer having a thickness of about 0.1 nm to about 4 nm located between the second Ag layer and the second absorbing layer.

58. The low-emissivity coating of claim 56, further comprising a first nucleation layer between the first dielectric layer and the first Ag layer, said first nucleation layer having a thickness of about 2 nm to about 11 nm.

59. The low-emissivity coating of claim 56, wherein the thickness ratio of the first Ag layer/second Ag layer is at least about 80%.

60. The low-emissivity coating of claim 56, wherein the thickness ratio of the first Ag layer/second Ag layer is at least about 50%.

61. The low emissivity coating of claim 56, wherein the oxide of nickel and/or chromium comprises about 20 to about 55 atomic percent of oxygen.

62. The low emissivity coating of claim 61, wherein the oxide of nickel and/or chromium comprises about 20 atomic percent of oxygen.

63. A low-emissivity coating on a substrate, the coating comprising, in order outward from the substrate:
   a) a first dielectric layer comprising an oxide or oxynitride of silicon and/or aluminum and having a thickness of about 3 nm to about 30 nm;
   b) a first nucleation layer comprising an oxide of zinc and/or aluminum and having a thickness of about 3 nm to about 11 nm;
   c) a first Ag layer having a thickness of about 8 nm to about 12 nm;
   d) a first barrier layer comprising an oxide of nickel and/or chromium and having a thickness of about 0.8 nm to about 2 nm wherein the first barrier layer comprises about 15 to 60 atomic percent oxygen;
   e) a first absorbing layer comprising NiCr and having a thickness of about 1.5 nm to about 4 nm;
   f) a second dielectric layer comprising an oxide or oxynitride of silicon and/or aluminum and having a thickness of about 55 nm to about 75 nm;
   g) a second nucleation layer comprising an oxide of zinc and/or aluminum and having a thickness of about 3 nm to about 10 nm;
   h) a second Ag layer having a thickness of about 10 nm to about 15 nm;
   i) a second absorbing layer comprising NiCr and having a thickness of about 0.1 nm to about 2.2 nm;
   j) a third dielectric layer comprising an oxide or oxynitride of silicon and/or aluminum and having a thickness of about 24 nm to about 40 nm; and
   k) optionally, a topcoat layer and,
   wherein the first barrier layer is in direct contact with the first Ag layer and the first absorbing layer is in direct contact with the first barrier layer.

64. The coating of claim 63, further comprising a second barrier layer comprising an oxide of nickel and/or chromium and having a thickness of about 2 nm to about 4 nm, located between the second Ag layer and the second absorbing layer.

65. The low emissivity coating of claim 63, wherein the oxide of nickel and/or chromium comprises about 20 to about 55 atomic percent of oxygen.

66. The low emissivity coating of claim 65, wherein the oxide of nickel and/or chromium comprises about 20 atomic percent of oxygen.

67. A low-emissivity coating on a substrate, the coating comprising, in order outward from the substrate:
  a) a first dielectric layer comprising an oxide or oxynitride of silicon and/or aluminum;
  b) a first nucleation layer comprising an oxide of zinc and/or aluminum;
  c) a first Ag layer;
  d) a first barrier layer comprising an oxide of nickel and/or chromium wherein the first barrier layer comprises about 15 to 60 atomic percent oxygen;
  e) a first absorbing layer comprising NiCr metal;
  f) a second dielectric layer comprising an oxide or oxynitride of silicon and/or aluminum;
  g) a second nucleation layer comprising an oxide of zinc and/or aluminum;
  h) a second Ag layer;
  i) a second absorbing layer comprising NiCr metal;
  j) a third dielectric layer comprising an oxide or oxynitride of silicon and/or aluminum; and
  k) optionally, a topcoat layer, wherein the first barrier layer is in direct contact with the first Ag layer and the first absorbing layer is in direct contact with the first barrier layer.

* * * * *